(12) United States Patent
Cavalcanti et al.

(10) Patent No.: US 12,519,794 B2
(45) Date of Patent: Jan. 6, 2026

(54) APPARATUSES, METHODS, AND COMPUTER PROGRAM PRODUCTS FOR CENTRALIZED ACCESS PERMISSIONS MANAGEMENT OF A PLURALITY OF APPLICATION INSTANCES

(71) Applicants: ATLASSIAN PTY LTD., Sydney (AU); ATLASSIAN US, INC., San Francisco, CA (US)

(72) Inventors: Rachel De Paula Cavalcanti, Sydney (AU); Lavender Chan, Sydney (AU); Jieqing Huang, Sydney (AU); Kaustuv Mukherjee, Sydney (AU); Dipanjan Laha, Sydney (AU); Kieren Dight, Sydney (AU); Katarzyna Galek, Buderim (AU)

(73) Assignees: ATLASSIAN US, INC., San Francisco, CA (US); ATLASSIAN PTY, LTD., Sydney (AU)

( * ) Notice: Subject to any disclaimer, the term of this patent is extended or adjusted under 35 U.S.C. 154(b) by 209 days.

(21) Appl. No.: 18/358,505

(22) Filed: Jul. 25, 2023

(65) Prior Publication Data
US 2023/0370467 A1 Nov. 16, 2023

Related U.S. Application Data

(62) Division of application No. 17/347,930, filed on Jun. 15, 2021, now Pat. No. 11,757,887.

(51) Int. Cl.
*H04L 9/40* (2022.01)
*H04L 41/22* (2022.01)
(52) U.S. Cl.
CPC .......... *H04L 63/101* (2013.01); *H04L 63/102* (2013.01); *H04L 63/105* (2013.01); *H04L 41/22* (2013.01)

(58) Field of Classification Search
CPC ... H04L 63/101; H04L 63/102; H04L 63/105; H04L 41/22
See application file for complete search history.

(56) References Cited

U.S. PATENT DOCUMENTS 8,024,794 B1 9/2011 Feldman et al.
9,824,332 B1 11/2017 Everton et al.
(Continued)

OTHER PUBLICATIONS

U.S. Appl. No. 17/347,930, filed Jun. 15, 2021, U.S. Pat. No. 11,757,887, Issued.

*Primary Examiner* — Mahelet Shiberou
(74) *Attorney, Agent, or Firm* — Alston & Bird LLP

(57) ABSTRACT

Various embodiments of the present disclosure provide for centralized access permission management of a plurality of application instances. An example embodiment is configured to receive a manage access permissions request, cause rendering of a centralized access user interface, receive a domain access configuration request associated with a first domain, retrieve instance data associated with a plurality of application instances, cause rendering of a domain access configuration user interface associated with the first domain, receive a first product role selection request, generate a first domain permissions profile, the first domain permissions profile comprising at least a first product role associated with the first application instance, the first product role defining the role-based domain access permission of the first domain for accessing the first application instance, and store the first domain permissions profile in a permissions repository in association with the first domain and the first application instance.

22 Claims, 20 Drawing Sheets

(56) References Cited

U.S. PATENT DOCUMENTS

| | | |
|---|---|---|
| 10,826,974 B2 | 11/2020 | Mair et al. |
| 2007/0283443 A1 | 12/2007 | McPherson et al. |
| 2010/0142410 A1 | 6/2010 | Huynh et al. |
| 2012/0185581 A1 | 7/2012 | Desai et al. |
| 2018/0248885 A1 | 8/2018 | Lemay et al. |
| 2020/0151630 A1 | 5/2020 | Shakhnovich |
| 2021/0392142 A1 | 12/2021 | Stephens et al. |
| 2022/0286418 A1 | 9/2022 | Ali et al. |

ADD NEW DOMAIN

DOMAIN*

[INSERT DOMAIN NAME...]

| PRODUCT | PRODUCT ROLE | ADMIN APPROVAL |
|---|---|---|
| ◇ CONFLUENCE HR<br>ACME-HR.ATLASSIAN.NET | NONE ▼ | |
| ⚡ CONFLUENCE EXTERNAL<br>ACME-CS.ATLASSIAN.NET | NONE ▼ | |
| ◎ JIRA - CUSTOMER SUPPORT<br>ACME-CS.ATLASSIAN.NET | NONE ▼ | |
| ✕ CONFLUENCE INTERNAL<br>ACME.ATLASSIAN.NET | NONE ▼ | |

NOTIFY ORG ADMINS
○ NONE
◉ WHEN USERS GET ACCESS
○ ONLY WHEN USERS NEED ADMIN APPROVAL
○ NOTIFY: [ ]

CANCEL  [ADD]

FIG. 5A

ADD NEW DOMAIN

DOMAIN*

XYZ.COM

| PRODUCT | PRODUCT ROLE | ADMIN APPROVAL |
|---|---|---|
| ◇ CONFLUENCE HR<br>ACME-HR.ATLASSIAN.NET | AUDITOR ▼ | ☑ REQUIRED |
| ⚡ CONFLUENCE EXTERNAL<br>ACME-CS.ATLASSIAN.NET | NONE ▼ | |
| ▣ JIRA - CUSTOMER SUPPORT<br>ACME-CS.ATLASSIAN.NET | NONE ▼ | |
| ✗ CONFLUENCE INTERNAL<br>ACME.ATLASSIAN.NET | NONE ▼ | |

NOTIFY ORG ADMINS
○ NONE
◉ WHEN USERS GET ACCESS
○ ONLY WHEN USERS NEED ADMIN APPROVAL
○ NOTIFY:

CANCEL  ADD

FIG. 5C

EDIT DOMAIN

DOMAIN*

`ACME.COM`

| PRODUCT | ROLE | ADMIN APPROVAL |
|---|---|---|
| ◈ CONFLUENCE HR<br>ACME-HR.ATLASSIAN.NET | USER ▼ | ☐ REQUIRED |
| ⚡ CONFLUENCE EXTERNAL<br>ACME-CS.ATLASSIAN.NET | HELPSEEKER ▼ | ☐ REQUIRED |
| ▣ JIRA - CUSTOMER SUPPORT<br>ACME-CS.ATLASSIAN.NET | DEVELOPER ▼ | ☑ REQUIRED |
| ✕ CONFLUENCE INTERNAL<br>ACME.ATLASSIAN.NET | USER ▼ | ☑ REQUIRED |

NOTIFY ORG ADMINISTRATORS
○ NONE
◉ WHEN USERS GET ACCESS
○ ONLY WHEN USERS NEED ADMIN APPROVAL
○ NOTIFY: [　　　]

REMOVE                                         CANCEL  [SAVE]

FIG. 5D

ADMINISTRATION / ACME INC

ACCESS REQUESTS

USERS CAN REQUEST ACCESS TO A PRODUCT FOR THEMSELVES OR OTHERS. YOU CAN APPROVE OR DENY THESE REQUESTS HERE. ONLY WHEN YOU APPROVE A USER'S REQUEST, DO THEY COUNT TOWARDS YOUR BILL. LEARN MORE ABOUT JOIN SETTINGS

[UPDATE JOIN SETTINGS]

| WHO NEEDS ACCESS — 1202 | REQUESTED BY — 1204 | PRODUCT — 1206 | ACTIONS — 1208 |
|---|---|---|---|
| OMAR DARTOE<br>ODARTOE@ATLASSIAN.NET | OMAR DARTOE<br>35 MIN AGO | × CONFLUENCE<br>BEYOND-GRAVITY-ATLASSIAN.NET/WIKI | REVIEW REQUEST ...<br>APPROVE NOW<br>DENY<br>REQUEST MORE INFO |
| ANNIKA RANGARAJAN<br>ARNAGARAJAN@ATLASSIAN.NET | ANNIKA RANGARAJAN<br>7 HR AGO | × CONFLUENCE<br>ACME.ATLASSIAN.NET/WIKI | REVIEW REQUEST ... |
| TAHA KANDEMIR<br>TKANDAMIR@ATLASSIAN.NET | TAHA KANDEMIR<br>18 HR AGO | OPSGENIE<br>ACME | REVIEW REQUEST ... |
| JIE YAN SANG<br>TJSANG@ATLASSIAN.NET | JIE YAN SANG<br>21 HR AGO | ALL JIRA PRODUCTS<br>ACME.ATLASSIAN.NET | REVIEW REQUEST ... |
| FRAN PEREZ<br>FPEREZ@ATLASSIAN.NET | FRAN PEREZ<br>22 HR AGO | × CONFLUENCE<br>ACME.ATLASSIAN.NET/WIKI | REVIEW REQUEST ... |
| LEO LIMA [NEW USER]<br>LLIMA@ATLASSIAN.NET | LEO LIMA  NEW USER<br>1 DAY AGO | × CONFLUENCE<br>ACME.ATLASSIAN.NET/WIKI | REVIEW REQUEST ... |
| JANE ROTANSON<br>JROTANSON@ATLASSIAN.NET | JANE ROTANSON<br>1 DAY AGO | STATUSPAGE<br>WORKSPACE NAME | REVIEW REQUEST ... |
| COLLIN COLLARD [NEW USER]<br>CCOLLARD@ATLASSIAN.NET | COLLIN COLLARD  NEW USER<br>1 DAY AGO | BITBUCKET<br>ACME IOS | REVIEW REQUEST ... |

APPARATUSES, METHODS, AND COMPUTER PROGRAM PRODUCTS FOR CENTRALIZED ACCESS PERMISSIONS MANAGEMENT OF A PLURALITY OF APPLICATION INSTANCES

CROSS REFERENCE TO RELATED APPLICATIONS

This application is a divisional of U.S. patent application Ser. No. 17/347,930 filed Jun. 15, 2021, which is incorporated by reference herein in its entirety.

BACKGROUND

Various apparatuses, methods, and systems provide tools for management of user access settings to various resources in application management systems. Applicant has identified a number of deficiencies and problems associated with effectively and efficiently configuring and centrally managing user access for a plurality of users to a plurality of resources in existing application management systems. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved apparatuses, methods, systems, and computer program products configured for managing access permissions for a plurality of application instances in an application management system associated with an organization. In accordance with one exemplary embodiment of the present disclosure, an apparatus is provided for managing access permissions for a plurality of application instances associated with an organization, the apparatus comprising at least one processor and at least one non-transitory memory including program code, the at least one non-transitory memory and the program code configured to, with the at least one processor, cause the apparatus to receive a manage access permissions request from a computing device associated with an admin user, the manage access permissions request comprising an organization identifier; cause rendering of a centralized access user interface to a visual display of the computing device associated with the admin user in response to receiving the manage access permissions request, the centralized access user interface configured for managing access permissions of one or more domains; receive a domain access configuration request associated with a first domain in response to user interaction with the centralized access user interface; retrieve instance data associated with a plurality of application instances, each application instance associated with the organization identifier; cause rendering, based on at least the instance data, of a domain access configuration user interface associated with the first domain, the domain access configuration user interface comprising a plurality of application instance components, wherein each application instance component represents a respective application instance of the plurality of application instances and comprises a product role selection interface element; receive a first product role selection request in response to user interaction with a product role selection interface element corresponding to a first application instance; generate a first domain permissions profile, wherein the first domain permissions profile comprises at least a first product role associated with the first application instance, the first product role defining the role-based domain access permission of the first domain for accessing the first application instance; and store the first domain permissions profile in a permissions repository in association with the first domain and the first application instance.

In some embodiments, the first domain is a domain that has not been previously permissioned such that the domain access configuration request comprises a create domain request requesting creation of the first domain and configuration of the access permissions of the first domain.

In other embodiments, the first domain is a previously-permissioned domain such that domain access configuration request comprises a modify domain request requesting modification of the access permissions of the first domain. In some embodiments, retrieving instance data associated with the plurality of application instances comprises querying the permissions repository for domain permissions profiles associated with the first domain. In further embodiments, causing rendering of the domain access configuration user interface associated with the first domain comprises populating each product role selection interface element with a product role corresponding to the respective application instance based on the domain permissions profiles returned by the query.

In some embodiments, the apparatus is configured to receive a second product role selection request in response to user interaction with a product role selection interface element associated with a second application instance, update the first domain permissions profile such that the first domain permissions profile comprises at least the first product role associated with the first application instance and a second product role associated with the second application instance, the first product role and second product role defining the role-based domain access permissions of the first domain for accessing the first application instance and second application instance, respectively, and store the updated first domain permissions profile in the permissions repository in association with the first domain, the first application instance, and the second application instance.

In some embodiments, the apparatus is configured to receive a domain access configuration request associated with a second domain in response to user interaction with the centralized access user interface, cause rendering, based on the instance data, of a domain access configuration user interface associated with the second domain, receive a second product role selection request in response to user interaction with a product role selection interface element associated with the first application instance, generate a second domain permissions profile, wherein the second domain permissions profile comprises a second product role associated with the first application instance, the second product role defining the role-based domain access permission of the second domain for accessing the first application instance; and store the second domain permissions profile in the permissions repository in association with the second domain and the first application instance.

In certain embodiments, the first domain is a domain associated with the organization identifier. In other embodiments, the first domain is a domain not associated with the organization identifier.

In some embodiments, the domain access configuration user interface further comprises an admin approval user interface element associated with each application instance component of the plurality of application instance components, the admin approval user interface element configured for receiving an admin approval parameter request.

In some embodiments, the instance data associated with an application instance comprises one or more of an application instance identifier, an application instance name, an application instance URL, an application instance permissions profile, a set of available product roles.

In some embodiments, the product role selection interface element for the first application instance is associated with a plurality of available product roles. In some further embodiments, the product role selection interface element for the first application instance comprises a drop down menu, the drop down menu listing the plurality of available product roles associated with the first application instance, the product role selection interface element configured to receive a product role selection.

In another example embodiment, an apparatus for programmatically managing access permissions for a plurality of application instances associated with an organization is configured to receive an access application instance request associated with an application instance, the application instance associated with an organization and the access application instance request comprising a user email address identifier associated with a user; parse the user email address identifier for an email domain; query a permissions repository for a domain permissions profile based on the parsed email domain; in an instance wherein a domain permissions profile is returned by the query, determine whether the returned domain permissions profile comprises a product role associated with the requested application instance; and in an instance wherein the domain permissions profile comprises a product role associated with the requested application instance, provide the user with access to the application instance based on a role-based domain access permission corresponding to the product role. In certain further embodiments, in response to determining that the domain permissions profile does not comprise a product role associated with the requested application instance, the at least one non-transitory memory and the program code are further configured to, with the at least one processor, cause the apparatus to cause rendering of a request product access user interface to a visual display of a computing device associated with the access application instance request; receive a request product access request associated with the requested application instance in response to user interaction with the request product access user interface; generate a request product access notification associated with the requested application instance, the request product access notification comprising the user email address identifier; and transmit the request product access notification to at least one admin user associated with the organization.

In another example embodiment, a method for managing access permissions for a plurality of application instances associated with an organization comprises receiving a manage access permissions request from a computing device associated with an admin user, the manage access permissions request comprising an organization identifier; causing rendering of a centralized access user interface to a visual display of the computing device associated with the admin user in response to receiving the manage access permissions request, the centralized access user interface configured for managing access permissions of one or more domains; receiving a domain access configuration request associated with a first domain in response to user interaction with the centralized access user interface; retrieving instance data associated with a plurality of application instances, each application instance associated with the organization identifier; causing rendering, based on at least the instance data, of a domain access configuration user interface associated with the first domain, the domain access configuration user interface comprising a plurality of application instance components, wherein each application instance component represents a respective application instance of the plurality of application instances and comprises a product role selection interface element; receiving a first product role selection request in response to user interaction with a product role selection interface element corresponding to a first application instance; generating a first domain permissions profile, wherein the first domain permissions profile comprises at least a first product role associated with the first application instance, the first product role defining the role-based domain access permission of the first domain for accessing the first application instance; and storing the first domain permissions profile in a permissions repository in association with the first domain and the first application instance. In some embodiments, the first domain is a domain that has not been previously permissioned such that the domain access configuration request comprises a create domain request requesting creation of the first domain and configuration of the access permissions of the first domain. In other embodiments, the first domain is a previously-permissioned domain such that domain access configuration request comprises a modify domain request requesting modification of the access permissions of the first domain.

In some embodiments, retrieving instance data associated with the plurality of application instances comprises querying the permissions repository for domain permissions profiles associated with the first domain. In some embodiments, causing rendering of the domain access configuration user interface associated with the first domain comprises populating each product role selection interface element with a product role corresponding to the respective application instance based on the domain permissions profiles returned by the query.

In some embodiments, the method comprises receiving a second product role selection request in response to user interaction with a product role selection interface element associated with a second application instance; updating the first domain permissions profile such that the first permissions profile comprises at least the first product role associated with the first application instance and a second product role associated with the second application instance, the first product role and second product role defining the role-based domain access permissions of the first domain for accessing the first application instance and second application instance, respectively; and storing the updated first domain permissions profile in the permissions repository in association with the first domain, the first application instance, and the second application instance. In some embodiments, the method further comprises receiving a domain access configuration request associated with a second domain in response to user interaction with the centralized access user interface; causing rendering, based on the instance data, of a domain access configuration user interface associated with the second domain; receiving a second product role selection request in response to user interaction with a product role selection interface element associated with the first application instance; generating a second domain permissions profile, wherein the second domain permissions profile comprises a second product role associated with the first application instance, the second product role defining the role-based domain access permission of the second domain for accessing the first application instance; and storing the second domain permissions profile in the permissions repository in association with the second domain and the first application instance.

In some embodiments, the first domain is a domain associated with the organization identifier. In other embodiments, the first domain is a domain not associated with the organization identifier.

In some further embodiments, the domain access configuration user interface further comprises an admin approval user interface element associated with each application instance component of the plurality of application instance components, the admin approval user interface element configured for receiving an admin approval parameter request.

In some embodiments, the instance data associated with an application instance comprises one or more of an application instance identifier, an application instance name, an application instance URL, a domain permissions profile, and a set of available product roles. In some embodiments, the product role selection interface element for the first application instance is associated with a plurality of available product roles.

In some embodiments, the product role selection interface element for the first application instance comprises a drop down menu, the drop down menu listing the plurality of available product roles associated with the first application instance, the product role selection interface element configured to receive a product role selection.

In another example embodiment, a method for programmatically managing access permissions for a plurality of application instances associated with an organization, the method comprising receiving an access application instance request associated with an application instance, the application instance associated with an organization and the access application instance request comprising a user email address identifier associated with a user; parsing the user email address identifier for an email domain; querying a permissions repository for a domain permissions profile stored in association with the parsed email domain; in an instance wherein a domain permissions profile is returned by the query, determine whether the returned domain permissions profile comprises a product role associated with the requested application instance; and in an instance wherein the domain permissions profile comprises a product role associated with the requested application instance, provide the user with access to the application instance based on a role-based domain access permission corresponding to the product role. In some embodiments, the domain permissions profile comprises an admin approval parameter indicating that admin approval is required to access the requested application instance, prior to providing the user with access to the requested application instance, the method further comprises causing rendering of a request product access user interface to a visual display of a computing device associated with the access application instance request; receiving a request product access request associated with the requested application instance in response to user interaction with the request product access user interface; generating a request product access notification associated with the requested application instance, the request product access notification comprising the user email address identifier; and transmitting the request product access notification to at least one admin user associated with the organization.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
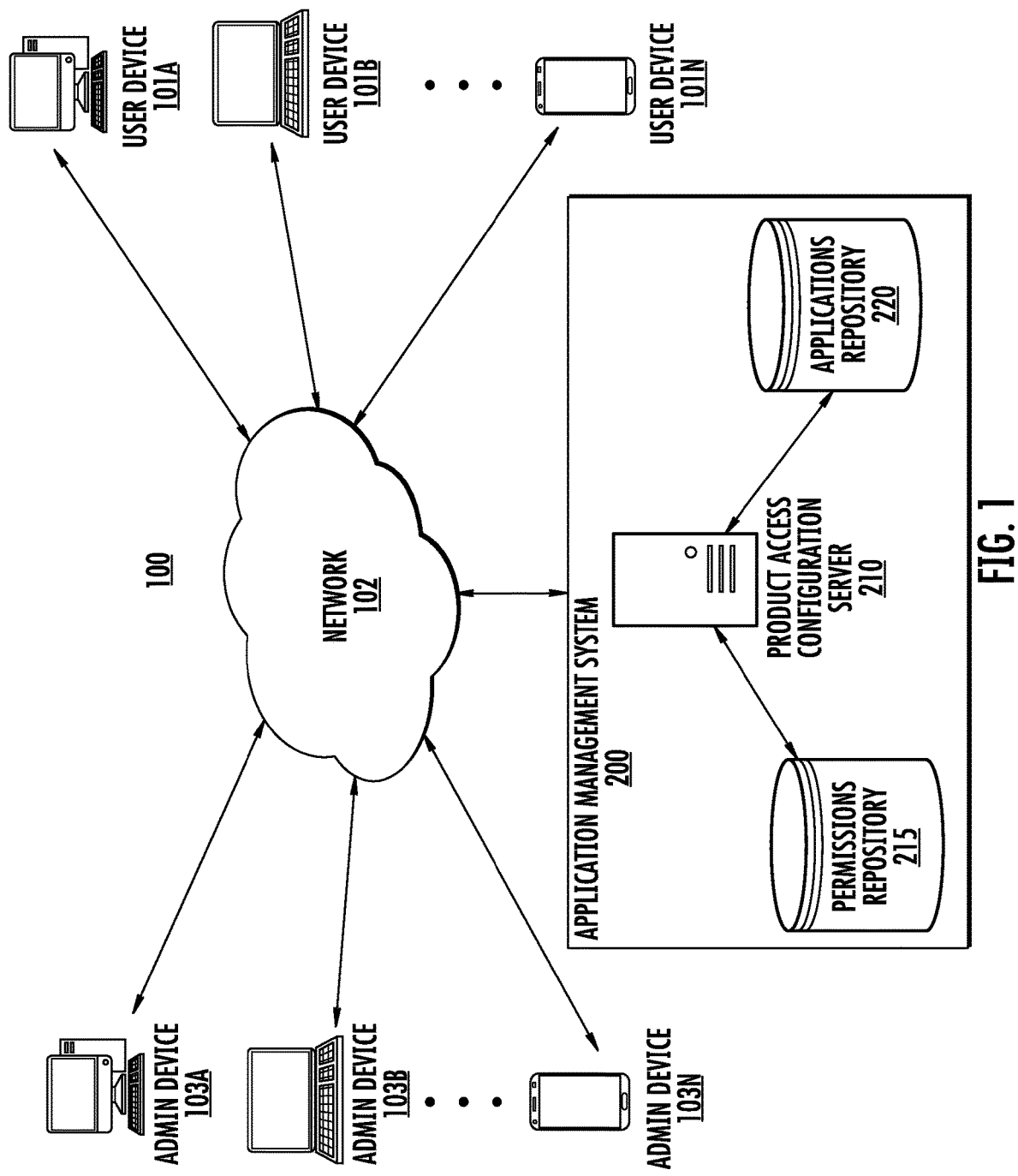
Figure 2:
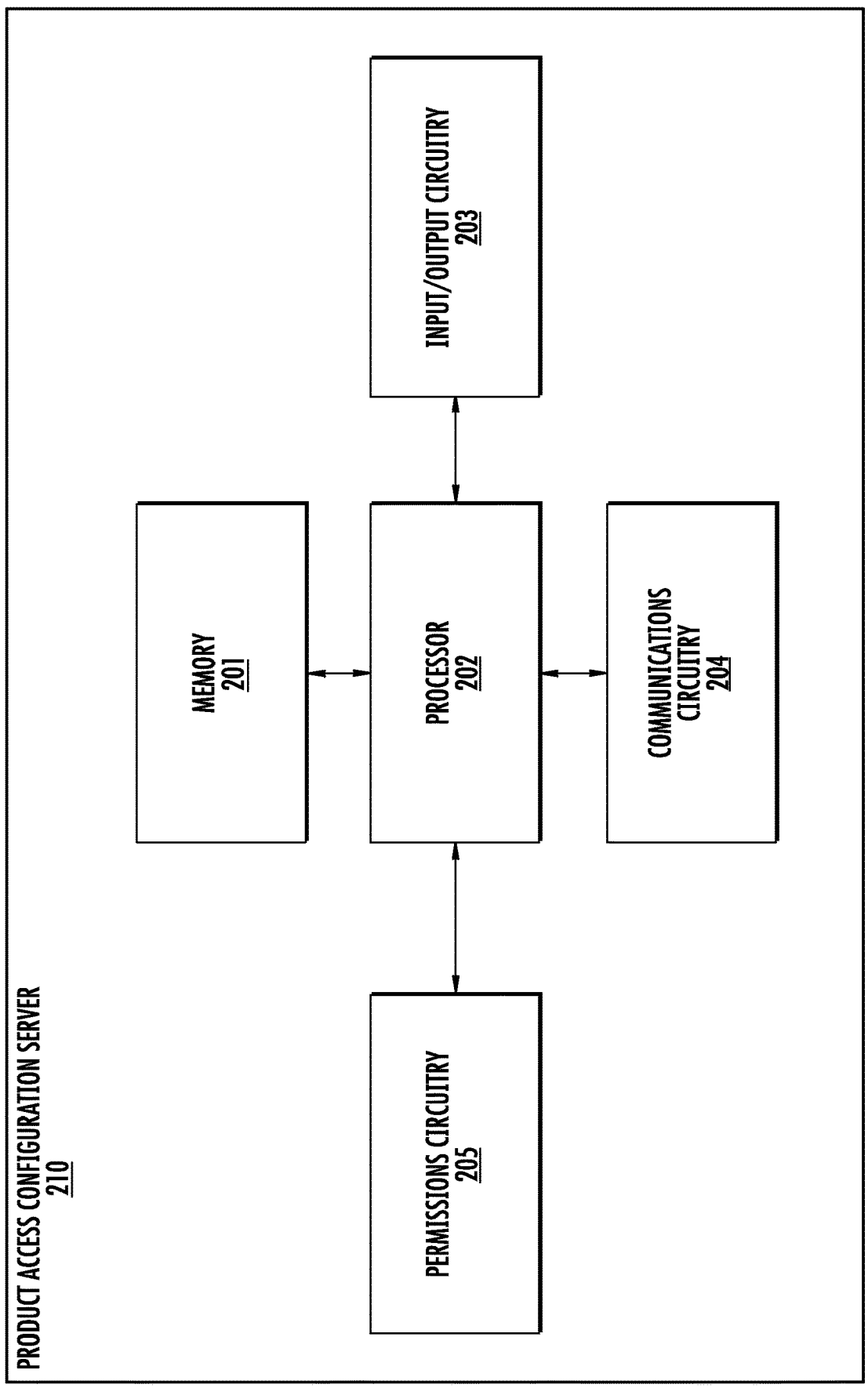
Figure 3:
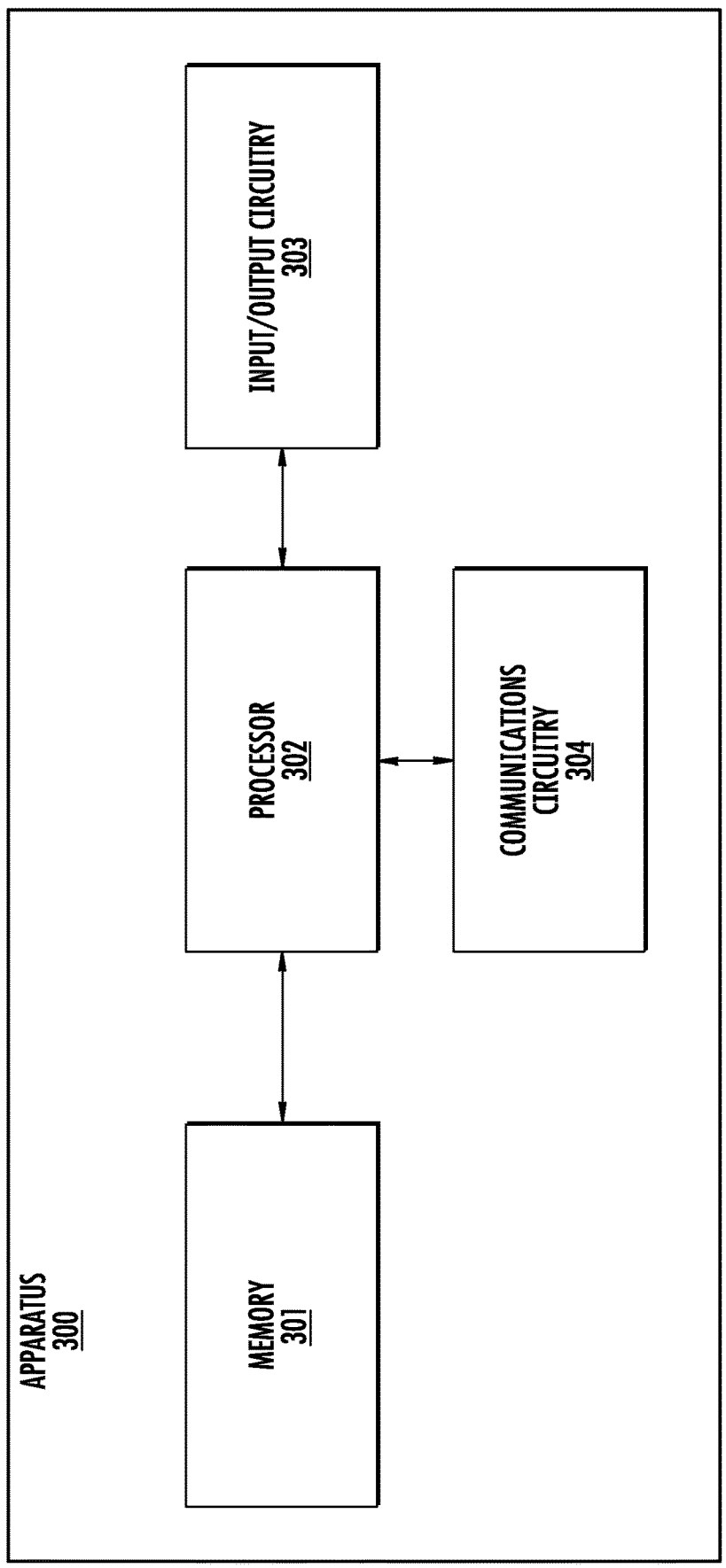
Figure 4:
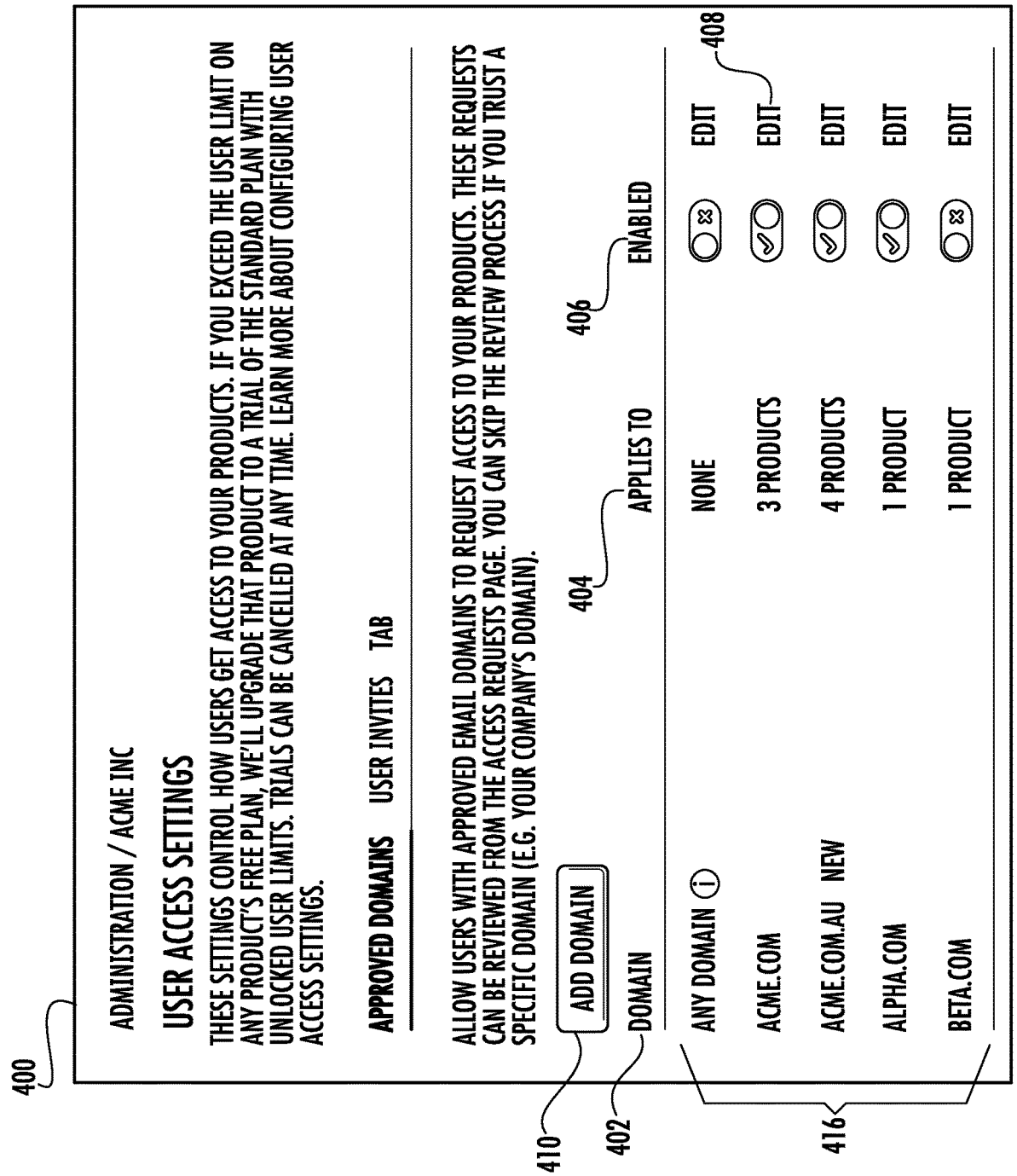
Figure 5B:
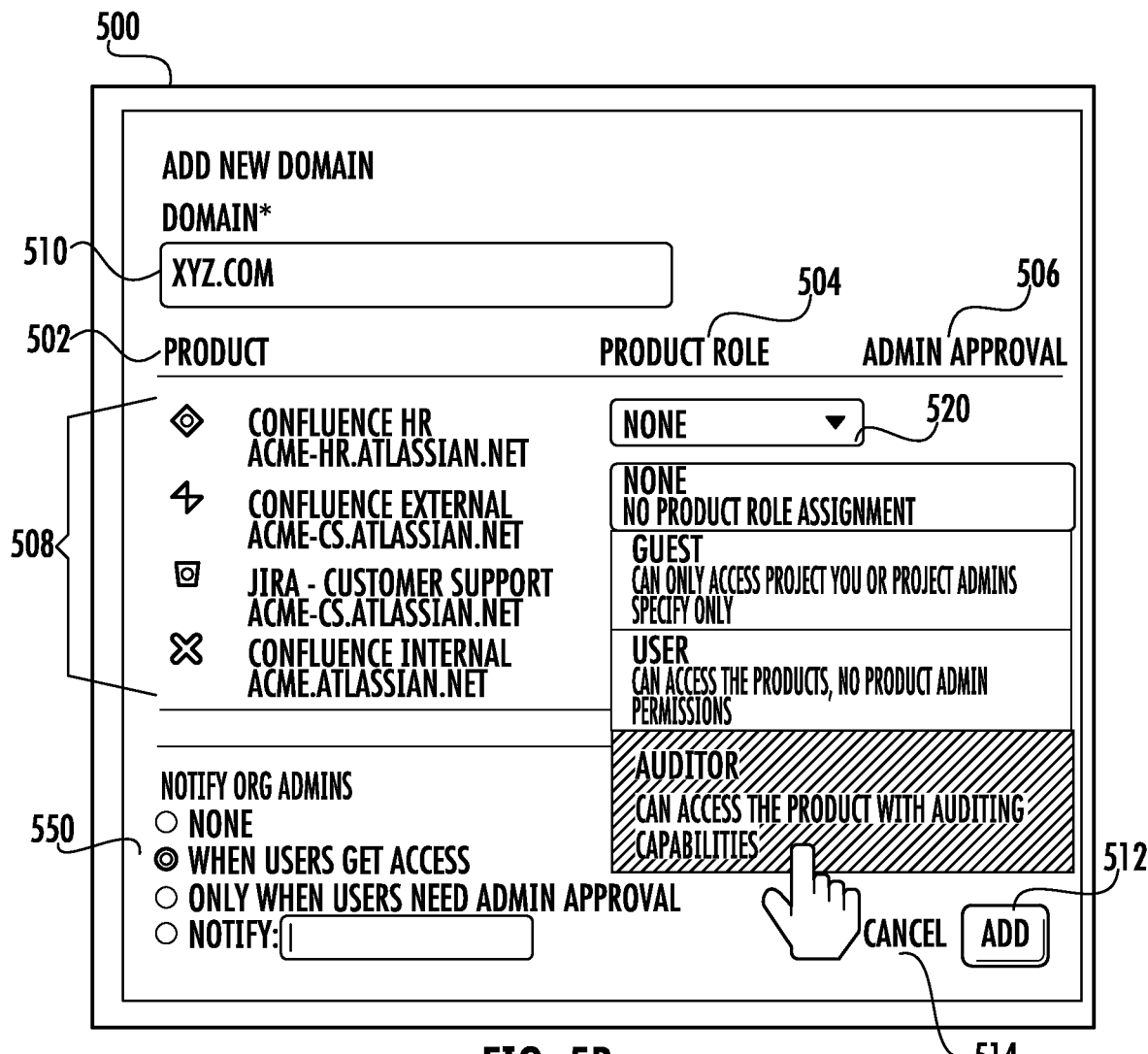
Figure 5E:
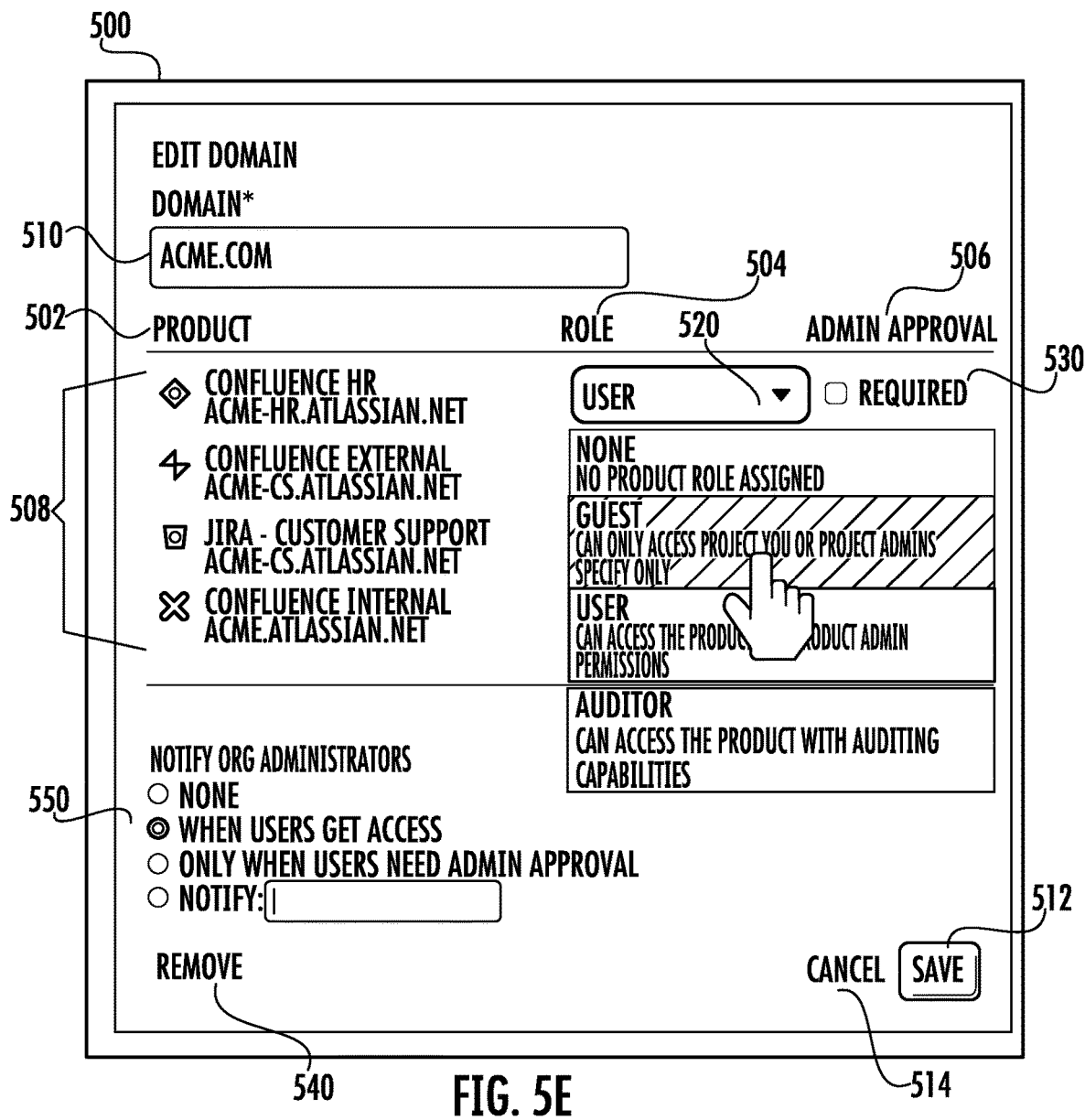
Figure 5F:
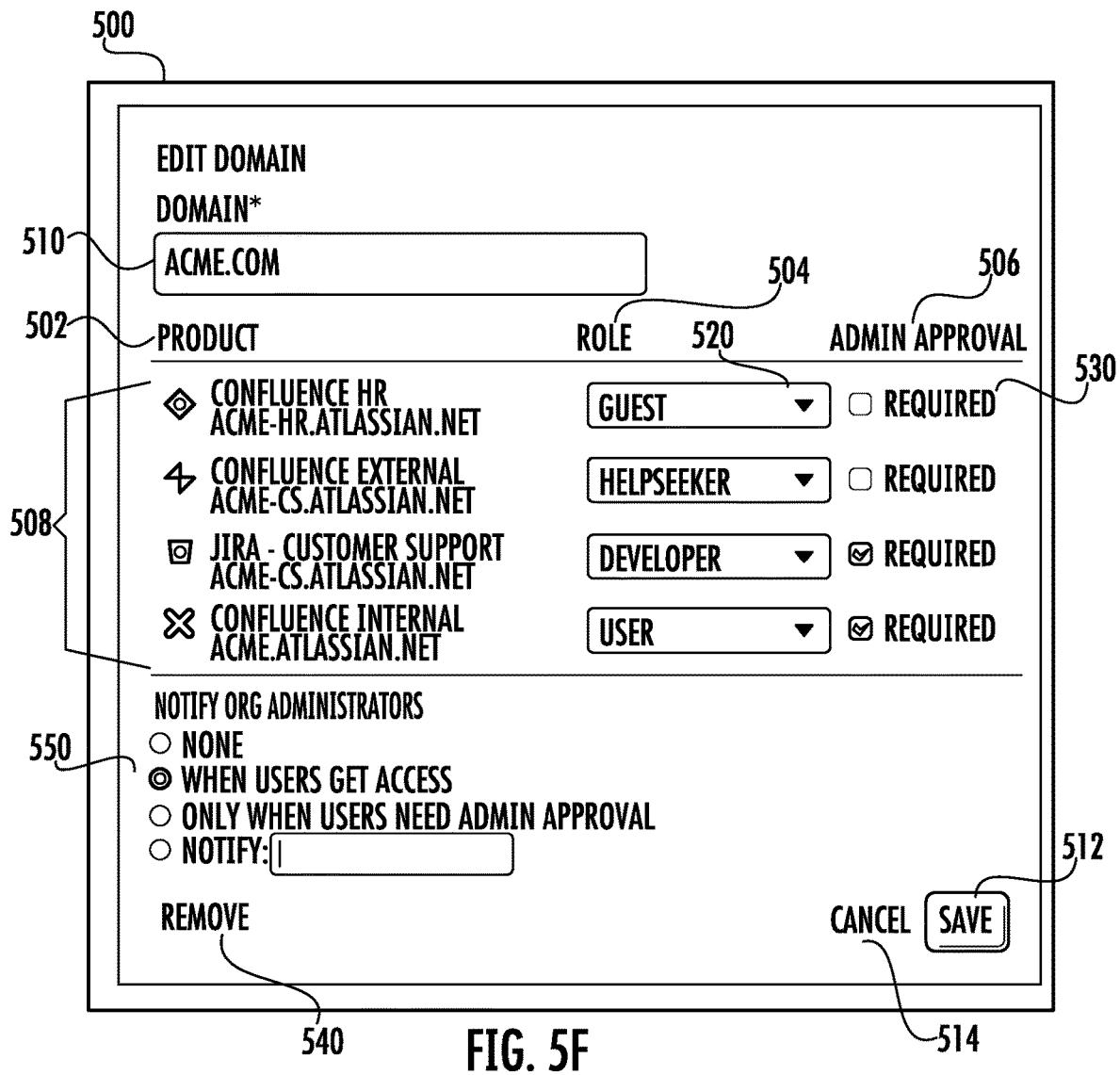
Figure 6A:
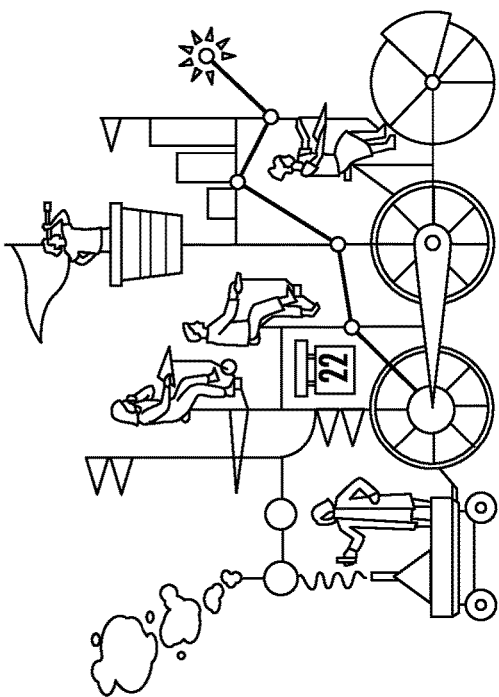
Figure 6B:
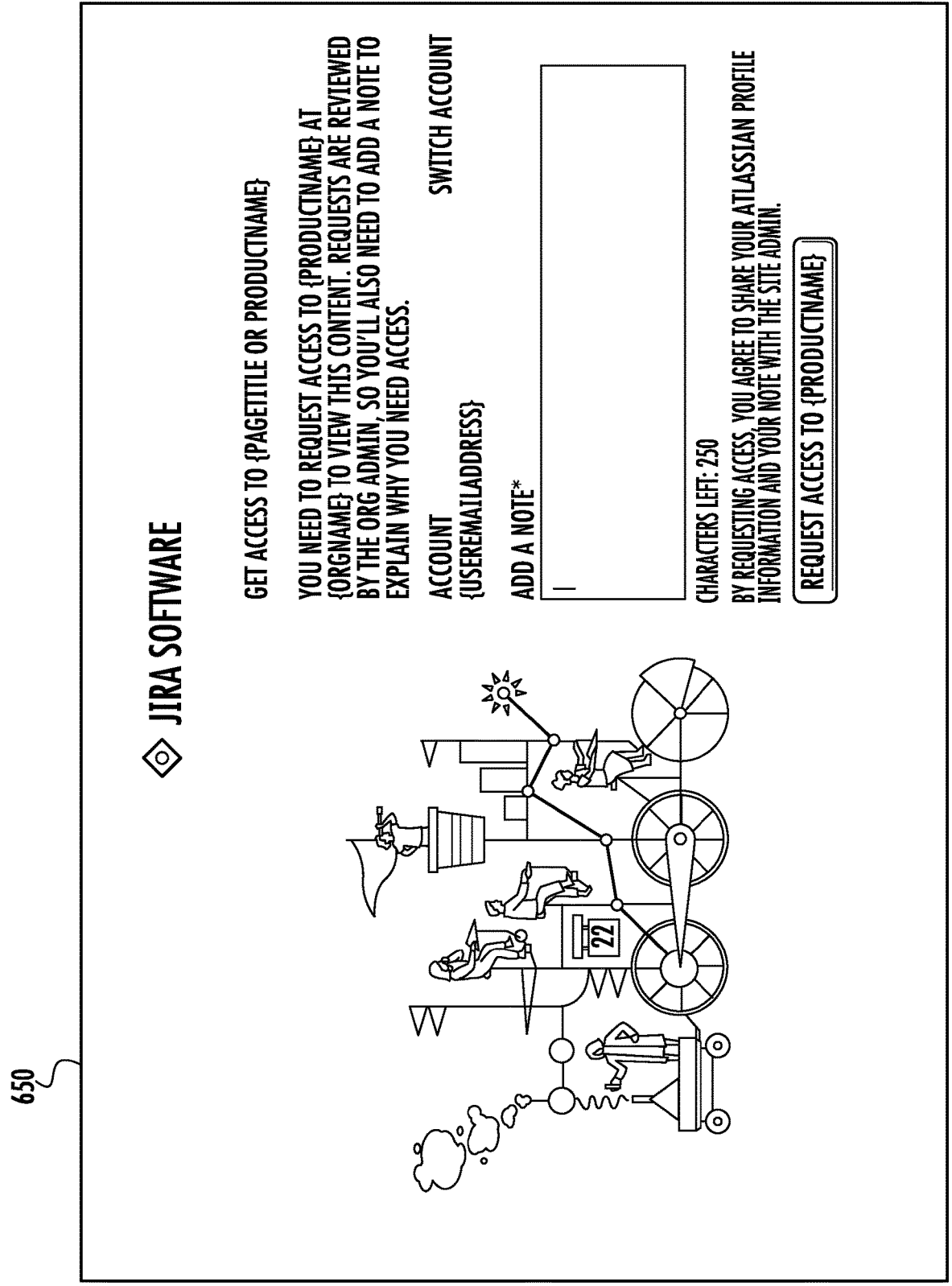
Figure 7A:
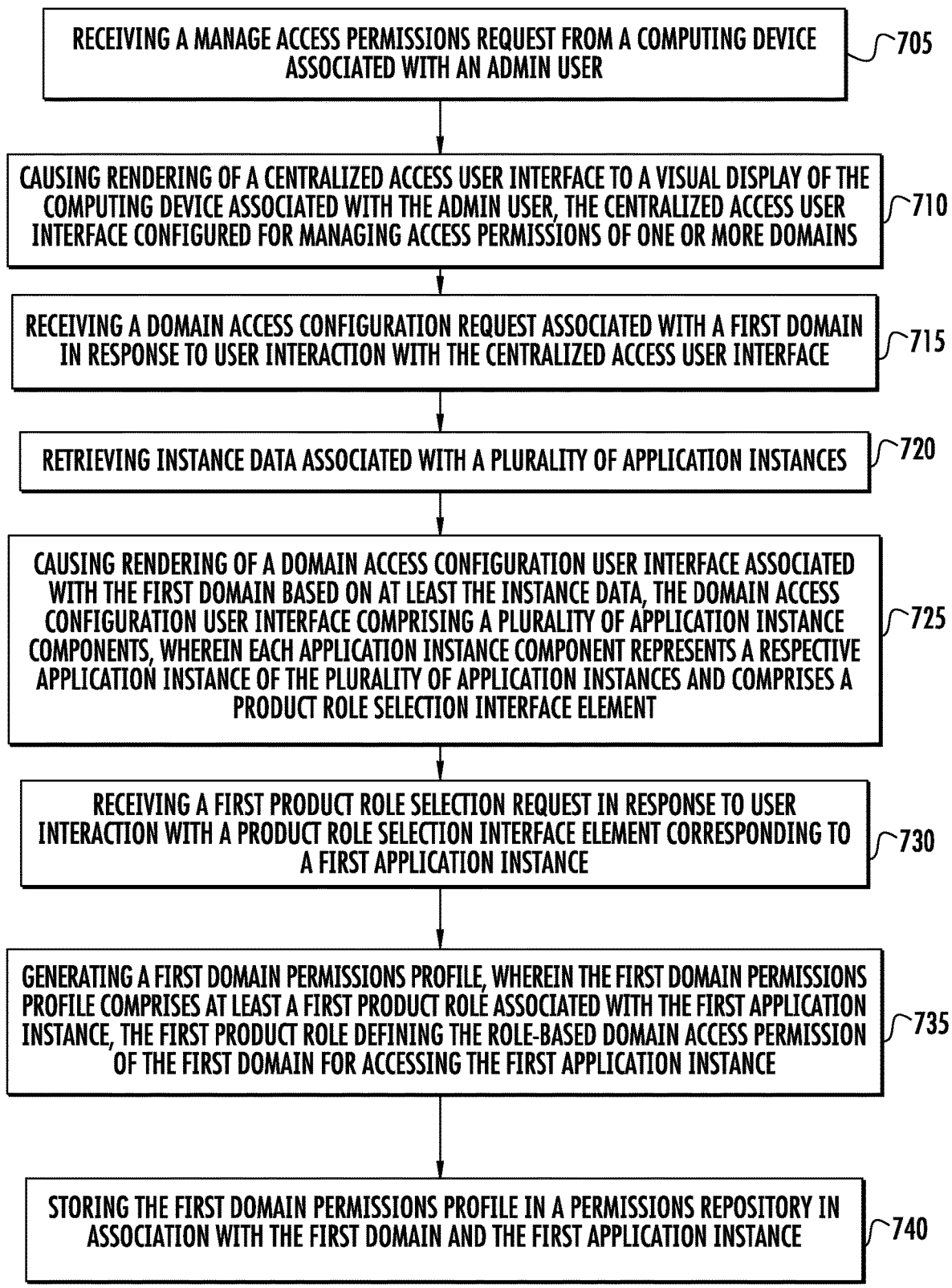
Figure 7B:
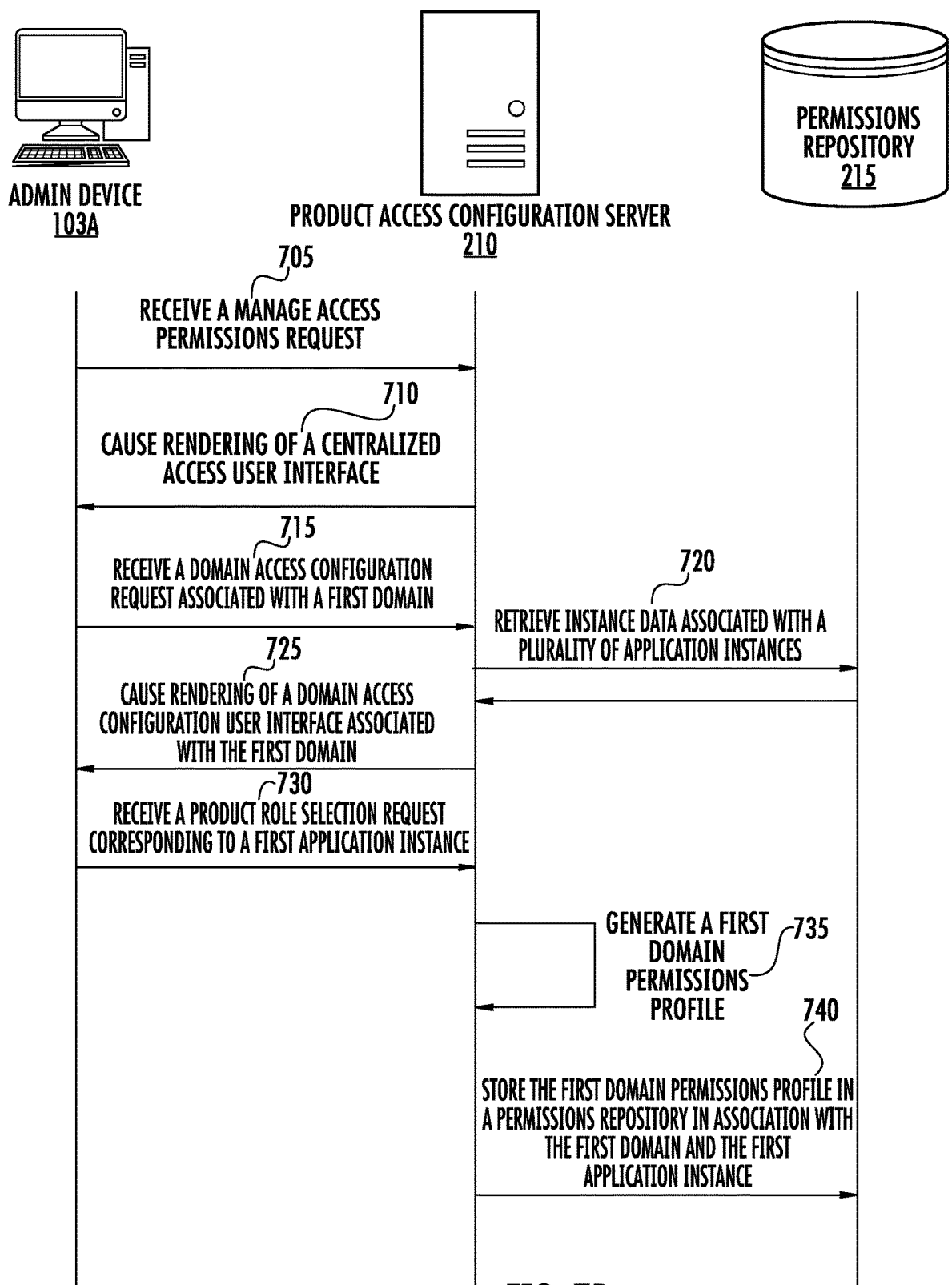
Figure 8:
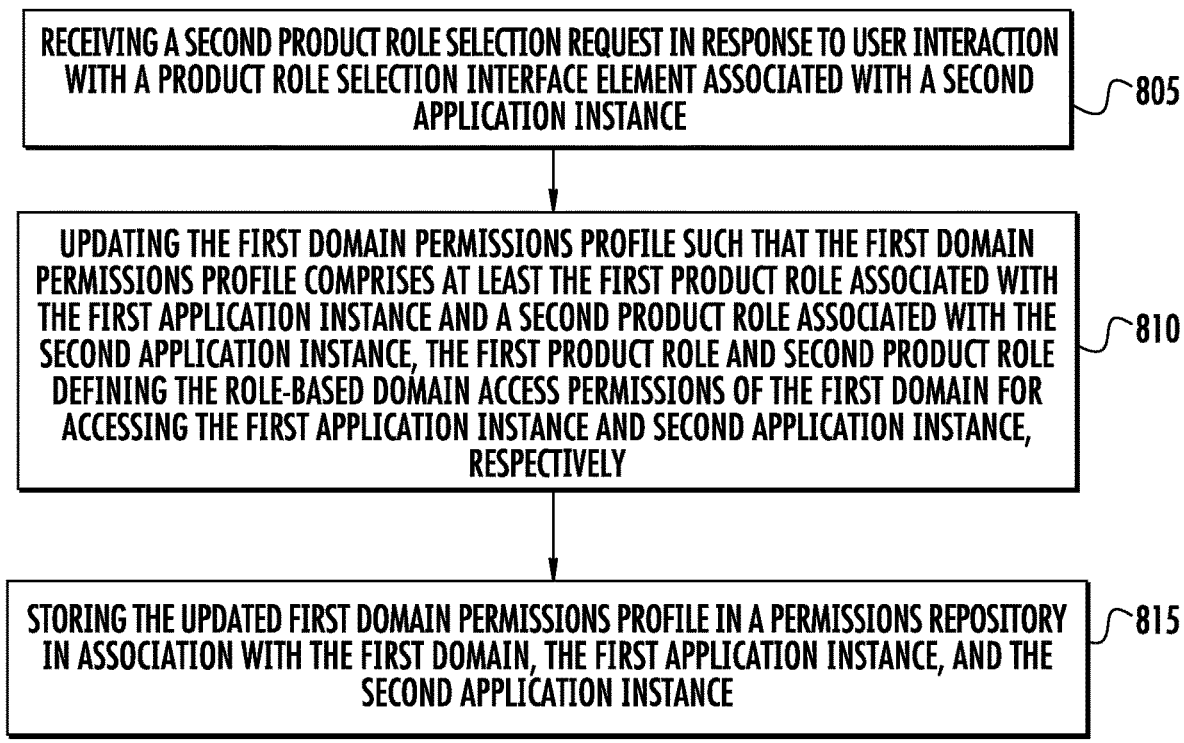
Figure 9:
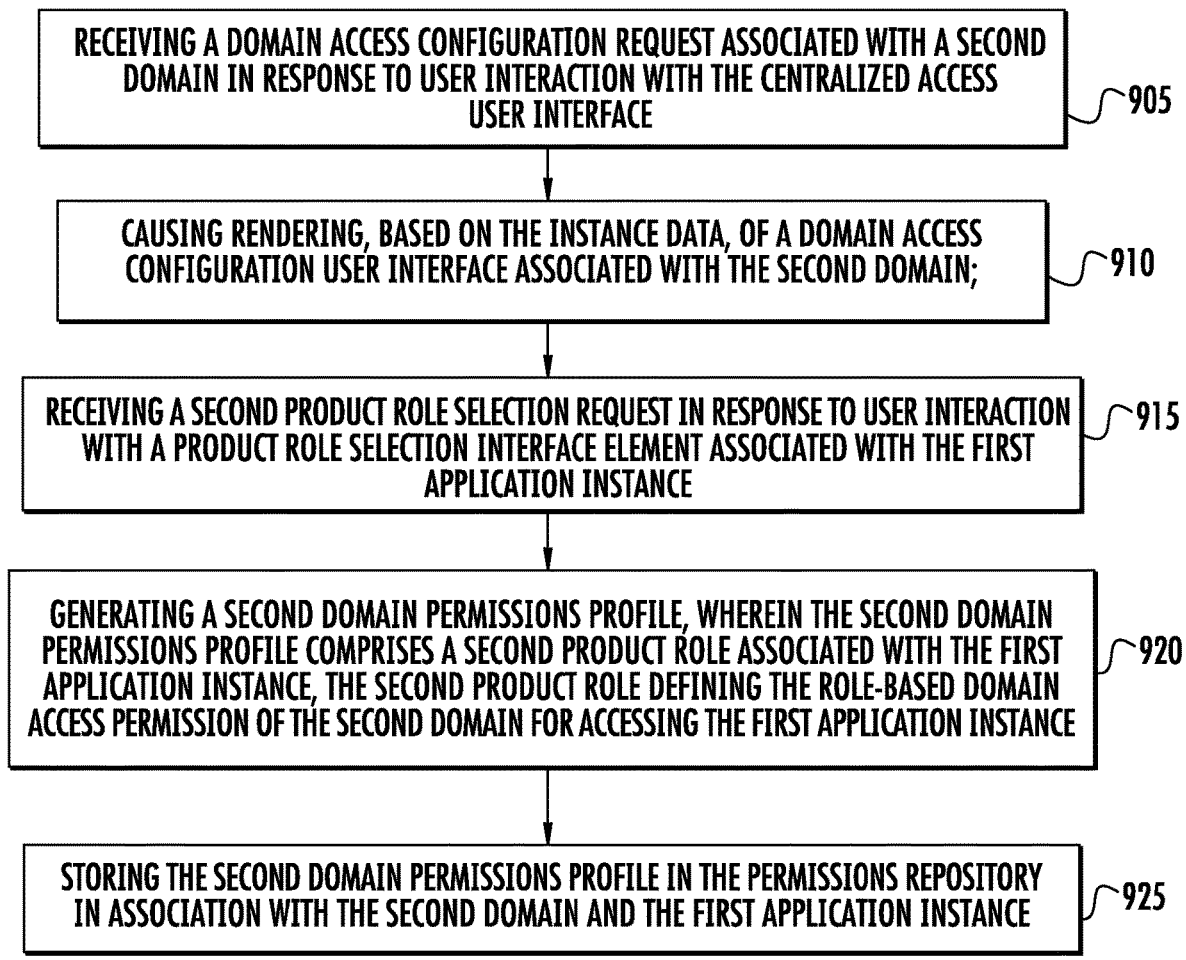
Figure 10A:
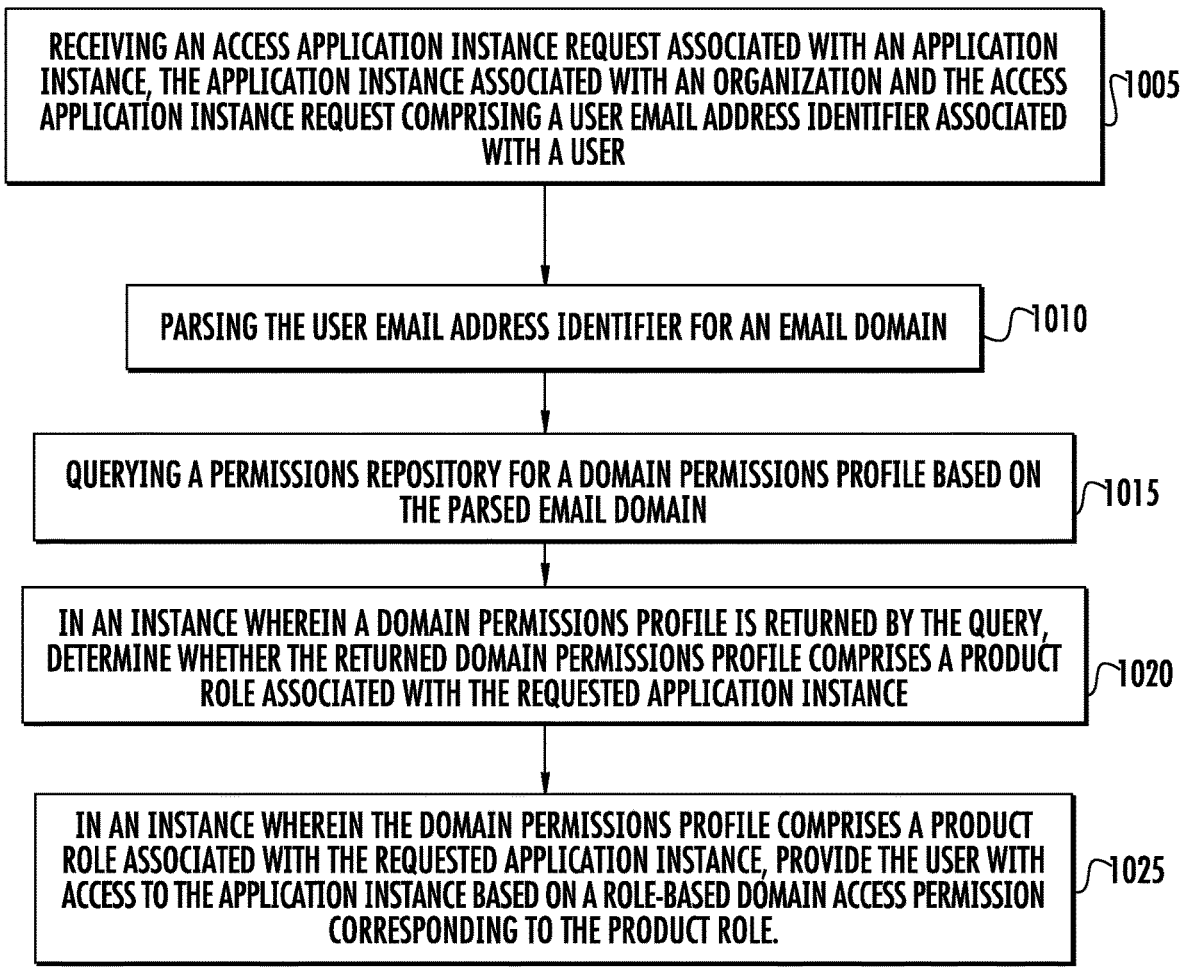
Figure 10B:
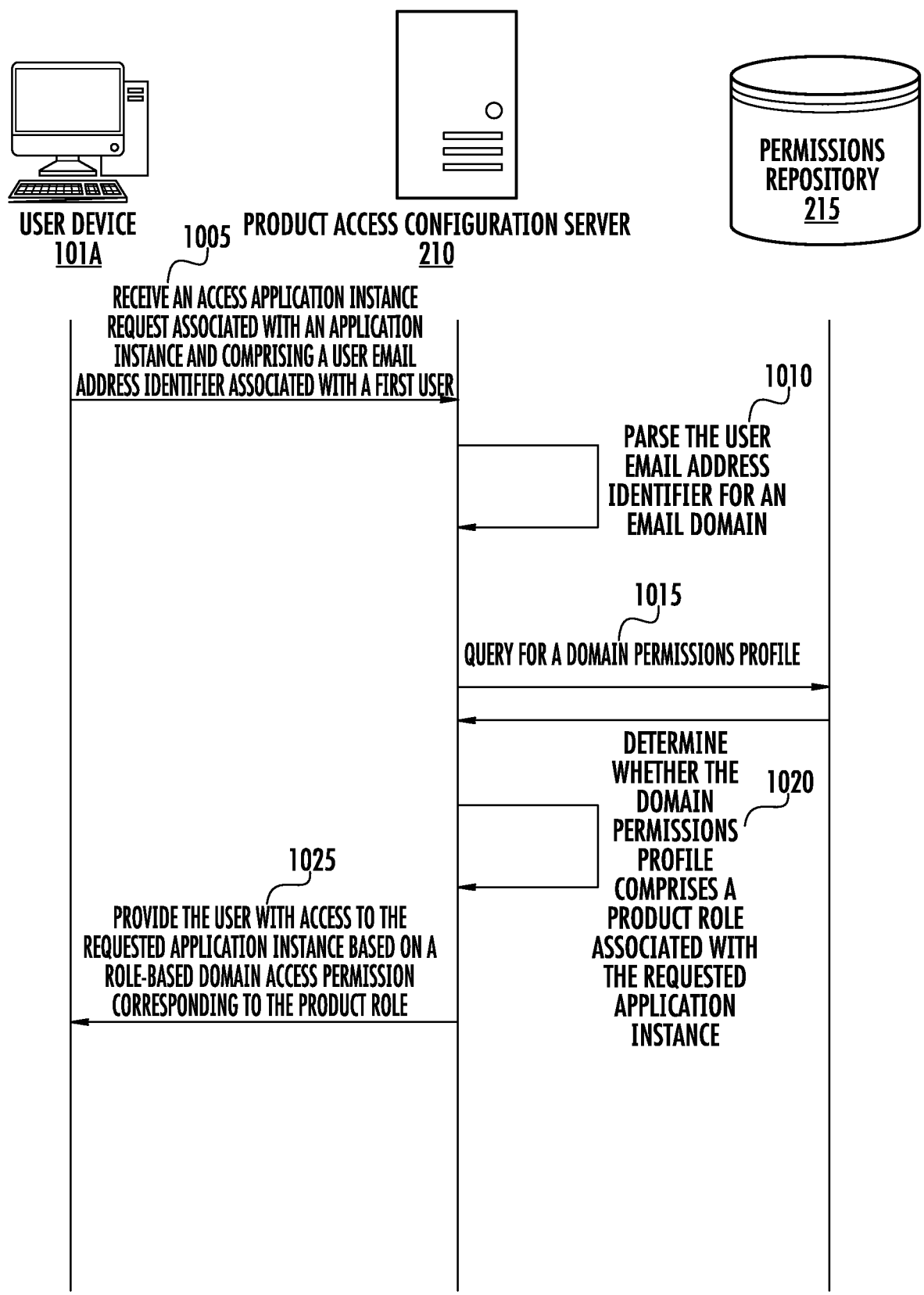
Figure 11:
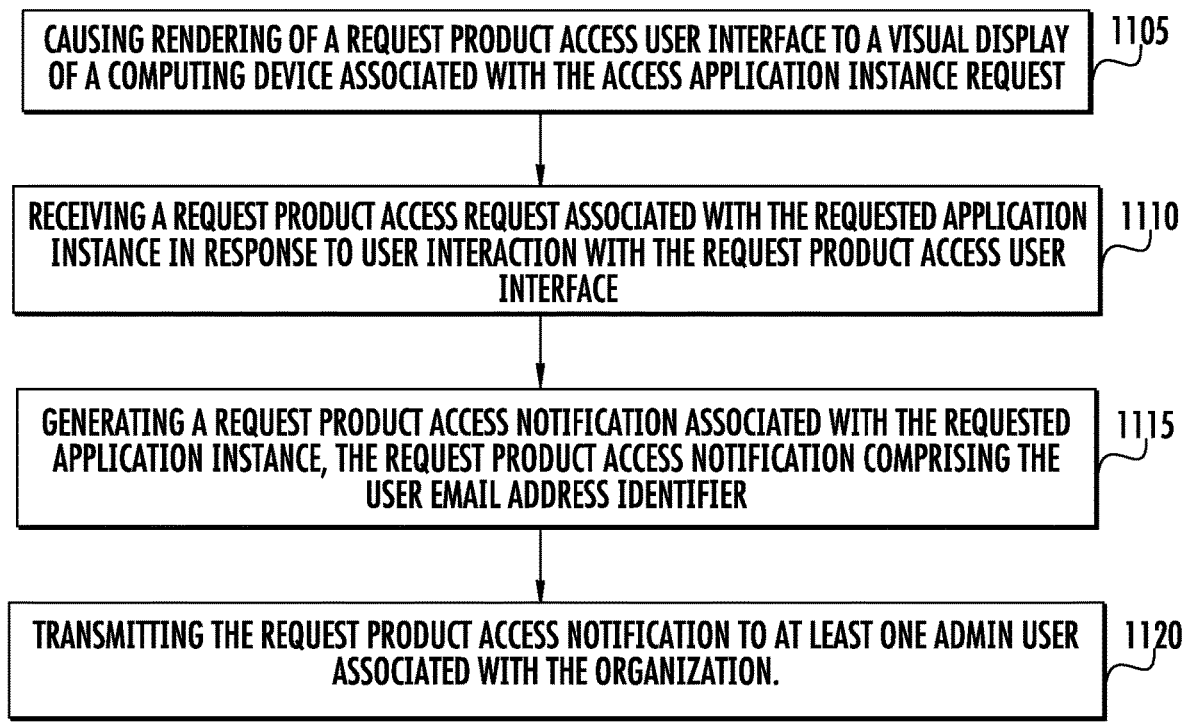

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates an example application management system configured to communicate with one or more admin devices and one or more user devices in accordance with some example embodiments described herein;

FIG. 2 is a schematic block diagram of example circuitry for use in a product access configuration server in accordance with some example embodiments described herein;

FIG. 3 is a schematic block diagram of example circuitry for use in an admin device or a user device for use by an admin user and user, respectively, in accordance with some example embodiments described herein;

FIG. 4 illustrates an example centralized access user interface for managing access permissions of one or more domains structured in accordance with some example embodiments described herein;

FIG. 5A illustrates an example domain access configuration user interface for adding a new domain, structured in accordance with some example embodiments described herein;

FIG. 5B illustrates an example domain access configuration user interface depicting an example interaction with a product role selection interface element for selecting a product role, structured in accordance with some example embodiments described herein;

FIG. 5C illustrates an example updated domain access configuration user interface depicting a selected product role, structured in accordance with some example embodiments described herein;

FIG. 5D illustrates an example domain access configuration user interface for editing a previously-permissioned domain, structured in accordance with some example embodiments described herein;

FIG. 5E illustrates an example domain access configuration user interface depicting an example interaction with a product role selection interface element for revising a product role, structured in accordance with some example embodiments described herein;

FIG. 5F illustrates an example updated domain access configuration user interface depicting a revised product role, structured in accordance with some example embodiments described herein;

FIG. 6A illustrates an example product access user interface, structured in accordance with some example embodiments described herein;

FIG. 6B illustrates an example request product access user interface, structured in accordance with some example embodiments described herein;

FIG. 7A is a flowchart illustrating example operations for managing access permissions for a plurality of application instances in accordance with various aspects and embodiments of the subject disclosure;

FIG. 7B is a signal diagram of an example data flow in accordance with various aspects and embodiments of the subject disclosure;

FIG. 8 is a flowchart illustrating example operations for managing access permissions for a plurality of application instances in accordance with various aspects and embodiments of the subject disclosure;

FIG. 9 is a flowchart illustrating example operations for managing access permissions for a plurality of application instances in accordance with various aspects and embodiments of the subject disclosure;

FIG. 10A is a flowchart illustrating example operations for programmatically managing access permissions for a plurality of application instances in accordance with various aspects and embodiments of the subject disclosure;

FIG. 10B is a signal diagram of an example data flow in accordance with various aspects and embodiments of the subject disclosure;

FIG. 11 is a flowchart illustrating example operations for programmatically managing access permissions for a plurality of application instances in response to an access application instance request associated with an unauthorized domain in accordance with various aspects and embodiments of the subject disclosure; and FIG. 12 illustrates an example access requests user interface structured in accordance with various embodiments of the present disclosure

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to a server or user device as an example "apparatus." However, elements of the apparatus described herein may be equally applicable to the claimed system, method, and computer program product. Accordingly, use of any such terms should not be taken to limit the spirit and scope of embodiments of the present disclosure.

Overview

Apparatuses, methods, systems, and computer program products are provided in accordance with example embodiments of the present disclosure in order to address technical problems associated with configuring and/or managing access permissions for a plurality of application instances in an application management system. An application management system enables an administrative user (e.g., admin user) of an organization to configure and/or manage user access settings in order to permission or provision various users for accessing a plurality of resources, such as applications and application instances associated with the organization. As the management of such user access settings begins to grow in complexity, for example, over time as an increasing number of applications and application instances are made available and an increasing number of users from a variety of different domains require various levels of access to such resources, the task of efficiently managing the access permissions also increases in complexity. Individual management of each user, or even at the individual application instance level, can become impractical. It is undesirable to require an admin user to separately access the user access settings associated with each individual application instance in a multi-instance environment as such inefficiency needlessly increases computational load and traffic. Further, such a process for access permissions management increases user frustration for admin users. Accordingly, the inventors have determined it would be desirable and advantageous to have centralized access permissions management with variable domain permissioning in an application management system. Embodiments herein provide apparatuses, systems, computer-implemented methods, and computer program products for centralized access permissions management of a plurality of application instances in an application management system. Some such embodiments provide improved functionality for managing any number of access permissions, for example, to manage access permissions for a plurality of application instances across multiple platforms in a centralized access user interface, thereby allowing for reduced operations compared to managing access permissions for such application instances individually.

The inventors have also determined it would be desirable and advantageous to be able to provision users with varied access permissions to a plurality of application instances without having to manually permission each individual user. By way of non-limiting example, consider Jennifer, an admin user for Acme Corporation, needing to permission access for XYZ Corporation to an Acme HR instance of Confluence® for purposes of an audit. It would be efficient for Jennifer to be able to broadly permission users associated with the "xyz.com" domain to the Confluence® application via domain access permissions, however, in a multi-instance environment, it is undesirable to broadly give the same users access to the entire Confluence® application (i.e., all instances of Confluence®). For example, it would be undesirable to also allow users of "xyz.com" domain to have access to Acme's internal knowledge instance of Confluence® simply because "xyz.com" is an authenticated domain permissioned to access the Acme HR instance of Confluence®. In this regard, such unfettered access to the entire Confluence® application may potentially pose data security and/or data privacy vulnerabilities. To efficiently permission a variety of users with respect to multiple instances of any number of applications without requiring admin Jennifer to separately and individually access the administrative settings for each application instance and to improve the user experience associated with assigning such access permissions (e.g., reduce the computational load/traffic required as well as interactions required by Jennifer), various embodiments of the present disclosure, utilizing user interactions with a centralized access user interface and an associated domain access configuration user interface, facilitate managing access permissions for a selected domain (e.g., xyz.com) with respect to a plurality of application instances. Some embodiments facilitate such variable domain permissioning by associating such selected domain with a selected product role for each respective application instance, the selected product role defining the role-based domain access permissions for such domain with respect to each corresponding application instance. For example, with respect to Acme's HR instance of Confluence® and Acme's internal knowledge instance of Confluence®, using various embodiments of the present disclosure, admin Jennifer can associate "xyz.com" with an "auditing" product role with respect to the HR instance of Confluence® and with a "None" or "No product access" product role with respect to Acme's internal knowledge instance of Confluence®, thereby preventing access by XYZ users to Acme's internal knowledge instance of Confluence®.

By way of another non-limiting example, using various embodiments of the present disclosure, admin Jennifer can permission users associated with the domain of Alpha Customer ("alpha.com") to have a "Customer" product role with respect to an instance of Jira® associated with software development for Alpha Customer and she can permission users associated with the domain of Beta Customer ("beta.com") to have a "Customer" product role with respect to an instance of Jira® associated with software development for Beta Customer. Jennifer can further permission a "None" or "No product access" product role or not assign any product role (e.g., providing no access) to users associated with the domain of Beta Customer with respect to the instance of Jira® associated with software development for Alpha Customer, thereby preventing users of Beta Customer from accessing Alpha Customer's data. Similarly, Jennifer can further permission a "None" or "No product access" product role or not assign any product role (e.g., providing no access) to users associated with the domain of Alpha Customer with respect to the instance of Jira® associated with software development for Beta Customer, thereby preventing users of Alpha Customer from accessing Beta Customer's data.

In accordance with various embodiments of the present disclosure, admin users can assign varied access permissions to a single application instance in a domain-centered way. In this regard, in another non-limiting example, admin Jennifer can permission users associated with the Acme domain ("acme.com") to have a "Developer" product role in a customer service instance of Jira® while also permissioning users associated with the domain of Alpha Customer ("alpha.com") to have a separate "Helpseeker" product role with respect to the same customer service instance of Jira®. In some embodiments, the level or type of access provided to the selected application instance is defined by the product role, the parameters, settings, entitlements, and indications of rights of which can be separately determined, defined, or assigned.

Accordingly, example embodiments of the present disclosure include enabling an admin user to permission users associated with a first domain in accordance with a product role defining a role-based domain access permission for accessing a first application instance. Additionally or alternatively, further embodiments enable an admin user to permission such first domain with a product role defining a role-based domain access permission for accessing a second application instance, wherein, in certain embodiments, the product role associated with the second application instance differs from the product role associated with the first application instance. Additionally or alternatively still, certain embodiments enable an admin user to permission users associated with a second domain with a product role defining a role-based domain access permission for accessing the same first application instance, wherein, in certain embodiments, the product role associated with the second domain differs from the product role associated with the first domain for accessing the first application instance. Some such embodiments provide functionality for configuring one or more associated improved user interfaces enabling centralized access permissions management of any number of application instances to reduce the number of user interactions required for managing access permissions for such application instances.

Example embodiments of the present disclosure address the various deficiencies set forth above and otherwise described herein, while also providing various technical benefits. For example, some embodiments of the present disclosure increase the efficiency and effectiveness of an application management system itself. For example, the amount of system resources expended and time allocated to determining individual user access permissions is costly and is only exacerbated as the number of application instances and users increase. Accordingly, some embodiments of the present disclosure reduce such computing resource consumption by the product access configuration server by generating a domain permissions profile and enabling role-based domain access permissions at the organization level (e.g., as opposed to the individual application instance level). Such reduced data processing amounts to less strain on the application management system itself, leading to increased lifetime and efficiency of the system. In addition, the role-based domain access permissions enable data security and data privacy across multiple instances of an application. As such, systems structured in accordance with various embodiments of the present disclosure may reduce computing resource consumption and provide specific, technical solutions to technical problems faced by existing systems, the details of which are described hereafter.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "user device" refers to computer hardware and/or software that is configured to access a service made available by a server, such as a product access configuration server of an application management system. The server is often (but not always) on another computer system, in which case the user device accesses the service by way of a network. User devices include, without limitation, smart phones, tablet computers, laptop computers, wearables, personal computers, enterprise computers, and the like. In some embodiments, a user device is associated with a user. The association may be created by the user device transmitting authentication information associated with the user to the application management system.

The term "application management system" refers to a software platform and associated hardware that is configured to support, maintain, and manage administration settings associated with one or more applications and/or application instances of an organization.

As used herein, the term "user identifier" refers to one or more items of data by which a user may be identified within an application management system. For example, a user identifier may comprise text string(s), numerical character(s), alphabetical character(s), alphanumeric code(s), ASCII character(s), a pointer, an IP address, a MAC address, a memory address, other unique identifier, or a combination thereof.

An organization may include one or more "administrative users" or "admin users", which refer to a user associated with the organization who has the administrative authority to manage the computing devices (e.g., user devices, servers, etc.) and associated resources of the organization. For example, an admin user has the authority to make decisions, on behalf of other users (e.g., non-administrative or non-admin users), with respect to the computing devices and/or associated resources of the organization. In some embodiments, an admin user has the authority to define one or more access permissions for a resource of the organization. In some embodiments, an admin user is associated with an "admin user identifier", which refers to an identifier that indicates the user is an admin user of an organization. A client computing device associated with an admin user is referred to as an "admin device".

The term "organization" refers to one or more data structures by which a set of users are associated with a particular entity (e.g., employees or contractors of different companies may be of separate organizations). The term "organization identifier" refers to one or more items of data by which an organization may be uniquely identifier. A non-limiting example of an organization identifier comprises American Standard Code for Information Interchange (ASCII) text, a pointer, a memory address, a unique numerical and/or string value, and the like.

The terms "application," "software application," "app," "product," or similar terms refer to a computer program or group of computer programs designed to perform coordinated functions, tasks, or activities for the benefit of a user or group of users. In certain embodiments, an application is designed for use by and interaction with one or more local, networked or remote computing devices, such as, but not limited to, user devices and/or admin devices. Examples of applications may include, but is not limited to, a project management and issue tracking application (e.g., Jira® by Atlassian), a knowledge management and collaboration application (e.g., Confluence® by Atlassian), workflow engines, scheduling engines, service desk incident management system, cloud services, word processors, spreadsheet generators, accounting applications, web browsers, messaging applications, email clients, media players, file viewers, videogames, photo/video editors, and/or the like. In some embodiments, an application is a cloud product.

The terms "application instance" and "instance" refer to a single or distinct occurrence of a software application running on a server or group of servers (e.g., a physical or virtual servers in a cloud-based computing environment). An organization may have one or more application instances or instances of each software application associated with such organization. For example, an organization may operate a selected single application as a single instance or as multiple instances (e.g., a multi-instance environment). An application instance can be made accessible to one or more users. In some embodiments, an application instance is hosted by or associated with a particular site (e.g., URL). For example, in a first non-limiting exemplary illustration, Acme Corporation has a single instance of Jira® and a single instance of Confluence®, each associated with a single site (e.g., all.acme.atlassian.com). In a second non-limiting exemplary illustration, XYZ Corporation has first instances of Jira® and Confluence® associated with its finance team at site.finance.xyz.atlassian.com and second instances of each of Jira® and Confluence® associated with its development team at site.dev.xyz.atlassian.com. In such example, although the underlying installation, functionality, and capabilities of various application instances may be the same, the data, data sets, information, messages, users, etc. associated with and populating a particular instance of an application can differ from other instances. For instance, in the previous example of XYZ Corporation, the users, data, information, etc. associated with the finance instance of Jira® can (and likely will) differ from the users, data, information, etc. associated with the development instance of Jira®. An organization may have multiple instances of an application for a variety of reasons, including, but not limited to, providing or preserving autonomy of existing, new, and/or acquired teams and departments of the organization (e.g., unique customization), data isolation (e.g., keep sensitive data separate) for security purposes, based on geography (e.g., sites, projects, and/or teams), and/or the like. In some embodiments, an application instance is associated with an "application instance identifier", which refers to one or more items of data by which a particular application instance of an organization may be identified within an application management system.

The term "instance data" refers to any data related to an application instance, such as, but not limited to, application instance identifier, application instance name, domain permissions profile, application instance URL (e.g., site hosting the application instance), available product roles (e.g., a set of available product roles), defined product roles, and any other data that may serve to distinguish one or more instances from each other. In some embodiments, instance data includes application instance plan identifier, such application instance plan identifier associated with a selection of features that are associated/available with respect to the selected application instance plan. For example, whether the selected application instance plan is free, standard, premium, or enterprise defines which features are associated with the selected application instance plan in an application management system.

The term "domain data" refers to any data related to a domain, such as, but not limited to, domain identifier (e.g., email domain identifier), domain name, domain permissions profile, domain licensee count, defined product roles, date the domain was added, date the domain was last edited, enablement/disablement data, and any other data that may serve to distinguish one or more domains from each other.

As used herein, the term "access permissions" refers to one or more parameters, configurations, provisions, settings, levels, entitlements, indications of rights and/or permissions data associated with accessing one or more requested resources that indicate to an access configuration server certain users or types of users that are permissioned or authorized to access the one or more requested resources or functionality, and in some instances, defining the level or type of access available to such users. For example, in some embodiments, a user or group of users is associated with a particular level or type of access to a given resource, whereby the user or group of users are granted access to certain features of the given resource but not others. In some embodiments, an access permission is associated with a domain identifier, indicating that a user with an email address with the same domain identified by domain identifier is permissioned to access the requested resource. Such access permissions are "domain access permissions." For example, a domain access permission may authorize all users with email addresses that end in "acme.com" access to the requested resource. This would broadly give access to a selected resource to any user who is a member of Acme Corporation and has a corresponding email address. This type of access permission is useful when an admin user desires to make an application available to everyone within an organization or group. Additionally or alternatively, in some embodiments, such as multi-instance environments for example, product roles are associated with a domain such that the level or type of access provided to users from such domain can be separately specified or defined for each application instance. Such access permissions are "role-based domain access permissions."

The term "product access configuration server" refers to a software platform and associated hardware that is configured to manage access to the various resources of an organization, such as applications or individual application instances. The product access configuration server is accessible via one or more computing devices, is configured to receive configuration and/or permissions requests, and access one or more data repositories, such as a permissions repository and/or an applications repository. The functionality of the product access configuration server may be provided via a single server or a collection of servers having a common functionality, or the functionality of the product access configuration server may be segmented among a plurality of servers or collections of servers performing subsets of the described functionality of the product access configuration server, such as in a cloud server environment.

The term "manage access permissions request" refers to an electrically generated digital object created by a computing device that indicates that a user (e.g., an admin user) has provided an input comprising a request to configure and/or manage access permissions for one or more resources of an organization. A manage access permissions request may be represented via a temporary code that notifies a recipient (e.g., a product access configuration server) that a user has made the request. To provide further context, a manage access permissions request is generated in response to a user interaction with a computing device wherein a user causes the computing device to generate a manage access permissions request by interacting with, for example, a specific access permissions configuration actuator button or interface element rendered on a visual display of the computing device (e.g., an admin user clicking on "User Access Settings"). In some embodiments, the manage access permissions request is associated with at least an organization identifier (e.g., such that the request is associated with a particular organization) and/or other data for use in retrieving organization relevant data for rendering a centralized access user interface as described herein. For example, in a non-limiting exemplary illustration, Jennifer is an admin user for Acme Corporation and in response to Jennifer selecting the "User Access Settings" interface element associated with an administration user interface for Acme Corporation in the application management system, a manage access permissions request, comprising an organization identifier associated with Acme Corporation, is generated at Jennifer's admin device and transmitted via a network to a server (e.g., product access configuration server). In some embodiments, an admin user identifier associated with Jennifer is associated with the manage access permissions request.

The term "centralized access user interface" refers to a user interface that is rendered to a visual display and is specially configured to enable a user (e.g., an admin user) to centrally configure and/or manage access permissions for one or more resources of an organization. In some embodiments, a centralized access user interface is configured to enable an admin user to identify, select, and/or create one or more domains (e.g., an email domain) in order to further define access permissions of users associated with such one or more domains. Exemplary centralized access user interfaces may be rendered in any desired form including, but not limited to, as a mobile application for display on a mobile computing device (e.g., a smartphone, table computer, etc.), a webpage or website for display on a mobile or non-mobile computing device via the Internet, and the like. For example, the centralized access user interface 400 of FIG. 4 is an example of a centralized access user interface.

The term "domain access configuration request" refers to an electrically generated digital object created by a computing device that indicates that a user (e.g., an admin user) has provided an input comprising a request to configure and/or manage access permissions for users associated with a selected domain such that the selected domain is permissioned. A domain access configuration request may be represented via a temporary code that notifies a recipient (e.g., a product access configuration server) that a user has made the request. To provide further context, a domain access configuration request is generated in response to a user interaction with a computing device wherein a user causes the computing device to generate a domain access configuration request by interacting with, for example, a specific domain access permissions configuration actuator button or interface element rendered on a visual display of the computing device. For example, in some embodiments, the selected domain is a new domain to be created, such as when an admin user clicks on an "Add Domain" interface element in a centralized access user interface as depicted in FIG. 4 to create/configure access permissions for a selected new domain. In some embodiments, the domain is an existing domain (e.g., previously-permissioned domain), such as when an admin user clicks on an "Edit" interface element associated with representation of the existing domain, as depicted in FIG. 4, to edit/manage access permissions for the selected existing domain.

In some embodiments, the selected domain is associated with a domain identifier, such that the request comprises a domain identifier associated with the selected domain. A "domain identifier" refers to one or more items of data by which a particular domain may be identified. For example, in a non-limiting exemplary illustration, Jennifer is an admin user for Acme Corporation and in response to Jennifer selecting the "Edit" interface element associated with existing domain "acme.com" in a centralized access user interface for Acme Corporation, a domain access configuration request, comprising a domain identifier associated with "acme.com", is generated at Jennifer's admin device and transmitted via a network to a server (e.g., product access configuration server). In some embodiments, a nonspecific domain identifier is associated with a domain (e.g., new domain to be created) until a unique domain identifier is associated with the domain.

The term "domain access configuration user interface" refers to a user interface that is rendered to a visual display and is configured to enable a user (e.g., an admin user) to configure and/or manage access permissions of a plurality of application instances with respect to a selected domain. Exemplary domain access configuration user interfaces may be rendered in any desired form including, but not limited to, as a mobile application for display on a mobile computing device (e.g., a smartphone, table computer, etc.), a webpage or website for display on a mobile or non-mobile computing device via the Internet, and the like. For example, the domain access configuration user interfaces 500 of FIGS. 5A-5F are examples of domain access configuration user interfaces.

In some embodiments, a domain access configuration user interface comprises a domain name interface component. The term "domain name interface component" refers to a user interface element that is rendered as a portion of a domain access configuration user interface and is configured to enable a user to create and/or modify a domain name (e.g., text string) for the selected domain. For example, the domain name interface component 510 of FIGS. 5A-5F are examples of domain name interface components.

In some embodiments, a domain access configuration user interface comprises one or more application instance components. The term "application instance component" refers to a listing, identification, or any other representation of an application instance in a domain access configuration user interface. For example, in some embodiments, each application instance component is based on instance data of each respective application instance of a plurality of application instances associated with an organization. In some embodiments, an application instance component is associated with an application instance identifier and comprises a corresponding instance name associated with the application instance identifier. In some embodiments, an application instance component comprises a product role selection interface element. Additionally or alternatively, in some embodiments, an application instance component comprises an admin approval user interface element.

The term "product role selection interface element" refers to a user interface element that is rendered as a portion of a domain access configuration user interface and is configured to enable a user (e.g., admin user) to define (e.g. select) a product role to be assigned to the selected domain with respect to accessing the associated application instance. For example, the product role selection interface elements 520 of FIGS. 5A-5F are examples of product role selection interface elements. In some embodiments, the product role selection interface element is populated with one or more available product role(s) associated with the selected application instance.

The term "product role" refers to a defined set of one or more parameters, configurations, provisions, settings, levels, entitlements, indications of rights and/or permissions data associated with accessing one or more requested resources, particularly defining the level or type of access available to user or group of users. In some embodiments, a product role can be used to broadly define the role-based domain access permissions of a set of users associated with a selected domain. Product roles include, but are not limited to, user, guest, helpseeker, developer, customer, auditor, product administrator ("Product Admin"), view only, reporting, none (e.g., a product role defining no product access), any other product role that may serve to define access to a resource. For example, in some embodiments, a product admin product role is permissioned to alter settings for a particular product (e.g., workflows, settings, and schemas). In some embodiments, a view only product role is permissioned to view content in the selected application instance, but is restricted from other access. In other embodiments, a view only product role is permissioned to view content and comment in the selected application instance, but is restricted from other access. In some embodiments, a reporting product role is permissioned to access and alter certain content, such as dashboards, reports, and roadmaps. Such a reporting product role enables a user to report progress, for example, to executives/management. In some embodiments, a guest product role is permissioned to view and edit pages on selected sites to which the user is granted access, however, is restricted from viewing other uses outside the space. In certain embodiments, a helpseeker product role is permissioned to raise customer support tickets. In some embodiments, a customer product role is permissioned to raise customer support tickets as well as have access as otherwise specifically configured by an admin user.

In some embodiments, available product roles are predefined. In some further embodiments, available product roles are associated with and/or defined by an application instance plan identifier (e.g., free, standard, premium, enterprise, etc.). In still further embodiments, one or more product roles are configurable and/or defined by each organization (e.g., via admin user) in a separate user interface and associated with the product role selection interface element(s).

The term "product role selection request" refers to an electrically generated digital object created by a computing device upon user engagement with a product role selection interface element that indicates that a user has provided a selection of an available product role to be associated with a selected domain for a particular application instance. A product role selection request may be represented via a temporary code that is generated at an admin device (e.g., a client device of an admin user) and is transmitted to a recipient (e.g., a server) to notify the recipient that an admin user has made the request. To provide further context, a product role selection request is generated in response to a user interaction with a computing device, for example, with a domain access configuration user interface associated with a selected domain. In some embodiments, a user causes the computing device to generate a product role selection request by interacting with a product role selection interface element to indicate a selection of an available product role, for example, from a dropdown menu or via a radio button associated with an available product role rendered on a visual display of the computing device. For instance, in a non-limiting example, Jennifer, an admin user of Acme Corporation who desires to provide users of domain xyz.com with auditing capabilities (e.g., auditing access permission) with respect to an Acme HR instance of Confluence® indicates such desire by clicking on a radio button associated with the "Auditor" product role from a set of available product roles associated with the HR instance of Confluence®, the set of available product roles rendered as part of a product role selection interface element for the HR instance of Confluence® in a domain access configuration user interface associated with xyz.com. In a further non-limiting example, admin Jennifer of Acme Corporation also desires to provide users of domain xyz.com with customer access capabilities (e.g., customer access permission) with respect to an external facing customer instance of Confluence®. To do so, admin Jennifer clicks on a radio button associated with the "Customer" product role from a set of available product roles associated with the external facing customer instance of Confluence®, the set of available product roles rendered as part of a product role selection interface element for the external facing customer instance of Confluence® in a domain access configuration user interface associated with xyz.com. In still a further non-limiting example, admin Jennifer of Acme Corporation also desires to prevent users of domain xyz.com from accessing an Acme internal knowledge instance of Confluence®. To do so, admin Jennifer clicks on a radio button associated with the "None" product role from a set of available product roles associated with the internal knowledge instance of Confluence®, the set of available product roles rendered as part of a product role selection interface element for the internal knowledge instance of Confluence® in a domain access configuration user interface associated with xyz.com.

The term "admin approval user interface element" refers to a user interface element that is rendered as a portion of a domain access configuration user interface and is configured to receive an admin approval parameter request, thereby enabling a user (e.g., admin user) to define an admin approval access parameter associated with the corresponding application instance. For example, the admin approval user interface element 530 of FIGS. 5C, 5D, 5E, and 5F are examples of admin approval user interface elements.

The term "admin approval access parameter" refers to a parameter indicating whether approval by an admin user is required before a user is granted access to a selected resource (e.g., an application instance).

The term "domain permissions profile" refers to a domain-specific data structure or aggregation of a plurality of application instances and corresponding product role(s) associated with each application instance, each product role defining the role-based domain access permission of the associated domain for accessing the selected application instance. In some embodiments, a domain permissions profile is generated at the application management system (e.g., product access configuration server) in response to receipt of a product role selection request comprising a selected product role to be associated with the corresponding application instance in a domain access configuration user interface. In some embodiments, the domain permissions profile is stored in a database, for example, a permissions database, in association with at least the associated domain. In further embodiments, the domain permissions profile is stored in association with corresponding application instances for the selected domain.

The term "access application instance request" refers to an electrically generated digital object created by a computing device that indicates that a user has provided an input comprising a request to access a selected application instance. An access application instance request may be represented via a temporary code that notifies a recipient (e.g., a product access configuration server) that a user has made the request.

The term "request product access user interface" refers to a user interface that is rendered to a visual display and is configured to enable a user to interact with the interface to generate a request product access request that is transmitted to, for example, the product access configuration server. The term "request product access request" refers to an electrically generated digital object created by a computing device that indicates that a user has provided an input comprising a request for admin approval to access a selected application instance. Exemplary request product access user interfaces may be rendered in any desired form including, but not limited to, as a mobile application for display on a mobile computing device (e.g., a smartphone, table computer, etc.), a webpage or website for display on a mobile or non-mobile computing device via the Internet, and the like. For example, the request product access user interface 650 of FIG. 6B is an example of a request product access user interface.

The term "permissions repository" refers to a location, such as database stored on a memory device, which is accessible by one or more computing devices for retrieval and storage of data associated with access permissions. For example, the permissions repository includes one or more of domain permissions profile(s), instance identifier(s), domain identifier(s), product role(s), access permission(s) (e.g., role-based access permission(s)), and/or the like. The permissions repository may be a dedicated device and/or a part of a larger repository. The permissions repository may be dynamically updated or be static. In some embodiments, the permissions repository is encrypted in order to limit unauthorized access of such permissions data.

The term "applications repository" refers to a location, such as database stored on a memory device, which is accessible by one or more computing devices for retrieval and storage of data associated with applications and application instances. For example, the applications repository includes one or more of application instance identifier(s), domain identifier(s), product role(s) (e.g., available product role(s)), domain permissions profile(s), and/or the like. The applications repository may be a dedicated device and/or a part of a larger repository. The applications repository may be dynamically updated or be static. In some embodiments, the applications repository is encrypted in order to limit unauthorized access of such data.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Example System Architecture

Methods, apparatuses, systems, and computer program products of the present disclosure may be embodied by any of a variety of computing devices. For example, the method, apparatus, system, and computer program product of an example embodiment may be embodied by a networked device (e.g., an enterprise platform), such as a server or other network entity, configured to communicate with one or more devices, such as one or more user devices or one or more admin devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example application management system 200 configured to communicate with one or more admin devices 103A-103N and one or more user devices 101A-101N in accordance with some example embodiments described herein. Users and admin users may access an application management system 200 via a communications network 102 using one or more of user devices 101A-101N and admin devices 103A-103N, respectively. Application management system 200 may comprise a product access configuration server 210 in communication with at least one repository, such as permissions repository 215 and/or applications repository 220. Such repository(ies) may be hosted by the product access configuration server 210 or otherwise hosted by devices in communication with the product access configuration server 210. The application management system 200 is, in some embodiments, able to facilitate access and central management of access permissions to a plurality of application(s) and application instance(s), as will be described below.

Product access configuration server 210 may include circuitry, networked processors, or the like configured to perform some or all of the product access configuration server-based processes described herein, and may be any suitable network server and/or other type of processing device. In some embodiments, product access configuration server 210 may generate a domain permissions profile and/or transmit commands and instructions for rendering a centralized access user interface and domain access configuration server user interfaces to admin devices 103A-103N, using data from, for example, permissions repository 215 and/or applications repository 220. In this regard, the product access configuration server 210 may be embodied by any of a variety of devices, for example, the product access configuration server 210 may be embodied as a computer or a plurality of computers. For example, product access configuration server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith.

In some embodiments, product access configuration server 210 may be located remotely from the permissions repository 215 and/or applications repository 220, although in other embodiments, the product access configuration server 210 may comprise the permissions repository 215 and/or applications repository 220. The product access configuration server 210 may, in some embodiments, comprise several servers or computing devices performing interconnected and/or distributed functions. Despite the many arrangements contemplated herein, product access configuration server 210 is shown and described herein as a single computing device to avoid unnecessarily overcomplicating the disclosure.

Product access configuration server 210 can communicate with one or more user devices 101A-101N and/or one or more admin devices 103A-103N via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the application management system 200.

Permissions repository 215 may be stored by any suitable storage device configured to store some or all of the information described herein (e.g., memory 201 of the product access configuration server 210 or a separate memory system separate from the product access configuration server 210, such as one or more database systems, backend data servers, network databases, cloud storage devices, or the like provided by another device (e.g., online application or 3rd party provider), such as a Network Attached Storage (NAS) device or devices, or as a separate database server or servers. Permissions repository 215 may comprise data received from the product access configuration server 210 (e.g., via a memory 201 and/or processor(s) 202), and the corresponding storage device may thus store this data. Permissions repository 215 includes information accessed and stored by the product access configuration server 210 to facilitate the operations of the application management system 200. As such, permissions repository 215 may include, for example, without limitation, instance data, application instance identifier(s), domain data, domain identifier(s), organization identifier(s), admin user identifier(s), domain permissions profile(s), access permission(s) (e.g., role-based domain access permission(s)), product role(s) and/or the like.

Similarly, applications repository 220 may be stored by any suitable storage device configured to store some or all of the information described herein (e.g., memory 201 of the product access configuration server 210 or a separate memory system separate from the product access configuration server 210, such as one or more database systems, backend data servers, network databases, cloud storage devices, or the like provided by another device (e.g., online application or 3rd party provider), such as a Network Attached Storage (NAS) device or devices, or as a separate database server or servers. Applications repository 220 may comprise data received from the product access configuration server 210 (e.g., via a memory 201 and/or processor(s) 202), and the corresponding storage device may thus store this data. Applications repository 220 includes information accessed and stored by the product access configuration server 210 to facilitate the operations of the application management system 200. As such, applications repository 220 may include, for example, without limitation, user identifier(s), application instance identifier(s), application instance name(s), application instance URL(s), domain permissions profile(s), product role(s), instance data, and/or the like.

The user devices 101A-101N and admin devices 103A-103N may be implemented as any computing device as defined above. Electronic data received by the product access configuration server 210 from the user devices 101A-101N and admin devices 103A-103N may be provided in various forms and via various methods. For example, the user devices 101A-101N and admin devices 103A-103N may include desktop computers, laptop computers, smartphones, netbooks, tablet computers, wearables, and/or other networked device, that may be used for any suitable purpose in addition to presenting the product access configuration user interface to a user (e.g., planning user) and otherwise providing access to the application management system 200. The depictions in FIG. 1 of "N" user devices and "N" admin devices are merely for illustration purposes. According to some embodiments, the user devices 101A-101N may be configured to display an interface on a display of the user device for viewing, editing, and/or otherwise interacting with at least one product access user interface, which may be provided by the application management system 200. According to further embodiments, the user devices 101A-101N may be configured to display a request product access user interface and/or the like. According to still further embodiments, the admin devices 103A-103N may be configured to, among other operations, display an interface on a display of the admin device for viewing, editing, and/or otherwise interacting with one or more of a centralized access user interface, a domain access configuration user interface, a product role selection interface element, and/or admin approval user interface element.

In embodiments where a user device 101A-101N or an admin device 103A-103N is a mobile device, such as a smartphone or tablet, the user device 101A-101N or admin device 103A-103N may execute an "app" to interact with the application management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the user device 101A-101N or admin device 103A-103N may interact with the application management system 200 via a web browser. As yet another example, the user devices 101A-101N and admin devices 103A-103N may include various hardware or firmware designed to interface with the application management system 200.

Example Apparatus for Implementing Embodiments of the Present Disclosure

FIG. 2 shows a schematic block diagram of example circuitry, some or all of which may be included in a product access configuration server 210. In accordance with some example embodiments, product access configuration server 210 may include various means, such as memory 201, processor 202, input/output circuitry 203, and/or communications circuitry 204. In some embodiments, permissions circuitry 205 may also or instead be included. For example, where permissions circuitry 205 is included in product access configuration server 210, permissions circuitry 205 may be configured to facilitate the functionality discussed herein regarding managing access permissions for a plurality of applications instances, including but not limited to, generating, causing storage of, updating, and/or retrieving domain permissions profile(s). An apparatus, such as product access configuration server 210, may be configured, using one or more of the circuitry 201, 202, 203, 204, and 205, to execute the operations described above with respect to FIG. 1 and below in connection with FIGS. 4-12.

Although the use of the term "circuitry" as used herein with respect to components 201-205 are described in some cases with respect to functional limitations, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry.

The term "circuitry" should also be understood, in some embodiments, to include software for configuring the hardware. For example, in some embodiments, "circuitry" may include processing circuitry, storage media, network interfaces, input/output devices, and the like. In some embodiments, other elements of the product access configuration server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, product access configuration server 210. The memory 201 is non-transitory and may include, for example, one or more volatile and/or non-volatile memories, or some combination thereof. In other words, for example, the memory 201 may be an electronic storage device (e.g., a computer readable storage medium). The memory 201 may be configured to store information, data, content, applications, instructions, or the like, for enabling an apparatus, e.g., product access configuration server 210, to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling product access configuration server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by product access configuration server 210 during the course of performing its functionalities.

Processor 202 may be embodied in a number of different ways and may, for example, include one or more processing devices configured to perform independently. Additionally or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as product access configuration server 210. The plurality of processors may be in operative communication with each other and may be collectively configured to perform one or more functionalities of product access configuration server 210 as described herein.

In an example embodiment, processor 202 is configured to execute instructions stored in the memory 201 or otherwise accessible to processor 202. Alternatively or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause product access configuration server 210 to perform one or more of the functionalities of product access configuration server 210 as described herein.

In some embodiments, input/output circuitry 203 may, in turn, be in communication with processor 202 to provide an audible, visual, mechanical, or other output and/or, in some embodiments, to receive an indication of an input. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface (e.g., a centralized access user interface, a domain access configuration user interface, a product role selection interface element, an admin approval user interface element, a product access user interface, a request product access user interface, etc.) and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced as compared to embodiments where product access configuration server 210 may be implemented as an end-user machine or other type of device designed for complex user interactions. In some embodiments (like other components discussed herein), input/output circuitry 203 may even be eliminated from product access configuration server 210. Input/output circuitry 203 may be in communication with memory 201, communications circuitry 204, and/or any other component(s), such as via a bus. Although more than one input/output circuitry and/or other component can be included in product access configuration server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with product access configuration server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by product access configuration server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of product access configuration server 210, such as via a bus.

In some embodiments, permissions circuitry 205 may also or instead be included and configured to perform the functionality discussed herein related to managing access permissions of a plurality of applications instances. In some embodiments, permissions circuitry 205 includes hardware, software, firmware, and/or a combination of such components, configured to support various aspects of such centralized access management-related functionality, features, and/or services of the product access configuration server 210 as described herein. It should be appreciated that in some embodiments, permissions circuitry 205 performs one or more of such exemplary actions in combination with another set of circuitry of the product access configuration server 210, such as one or more of memory 201, processor 202, input/output circuitry 203, and communications circuitry 204. For example, in some embodiments, permissions circuitry 205 utilizes processing circuitry, such as the processor 202 and/or the like, to perform one or more of its corresponding operations. In a further example, in some embodiments, some or all of the functionality of permissions circuitry 205 may be performed by processor 202. In this regard, some or all of the example processes and algorithms discussed herein can be performed by at least one processor 202 and/or permissions circuitry 205. It should also be appreciated that, in some embodiments, permissions circuitry 205 may include a separate processor, specially configured field programmable gate array (FPGA), or application specific interface circuit (ASIC) to perform its corresponding functions.

Additionally or alternatively, in some embodiments, permissions circuitry 205 utilizes memory 201 to store collected information. For example, in some implementations, permissions circuitry 205 includes hardware, software, firmware, and/or a combination thereof, that interacts with permissions repository 215, applications repository 220, and/or memory 201 to send, retrieve, update, and/or store data values embodied by and/or associated with instance data, domain data, organization identifier(s), application instance identifier(s), domain identifier(s), user identifier(s), admin user identifier(s), application instance name(s), application instance URL(s), email address identifier(s), domain permissions profile(s), product role(s), access permission(s) (e.g., role-based domain access permission(s)) and associated data that is configured for association with managing access permissions of a plurality of application instances including, for example, generating a domain permissions profile, and to support the operations of the permissions circuitry 205 and the remaining circuitry. Additionally or alternatively, in some embodiments, permissions circuitry 205 utilizes input/output circuitry 203 to facilitate user output (e.g., causing rendering of one or more user interface(s) such as a centralized access user interface), and/or to receive user input (e.g., user clicks, user taps, keyboard interactions, user gesture, and/or the like). Additionally or alternatively still, in some embodiments, the permissions circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and other computer-readable program code portions that can be executed to control processors of the components of product access configuration server 210 to implement various operations, including the examples shown herein. As such, a series of computer-readable program code portions may be embodied in one or more computer program products and can be used, with a device, product access configuration server 210, database, and/or other programmable apparatus, to produce the machine-implemented processes discussed herein. It is also noted that all or some of the information discussed herein can be based on data that is received, generated and/or maintained by one or more components of the product access configuration server 210. In some embodiments, one or more external systems (such as a remote cloud computing and/or data storage system) may also be leveraged to provide at least some of the functionality discussed herein.

Some embodiments of the present disclosure run outside of the application management system 200, such as, for example, on an apparatus 300. In some embodiments, the apparatus 300 is embodied as depicted and described in FIG. 3. FIG. 3 is a schematic block diagram is illustrated showing example circuitry, some or all of which may be included in an example apparatus 300 (e.g., a user device 101A-101N or an admin device 103A-103N), configured to enable a user to access the application management system 200 in accordance with certain embodiments of the present disclosure. For example, in some embodiments, the apparatus 300 embodies an admin device 103A-103N and is configured to enable an admin user to access the application management system 200 to centrally manage access permissions of a plurality of application instances. In still further embodiments, the apparatus 300 embodies a user device 101A-101N and is configured to enable a user to interact with the application management system 200 to be authenticated and/or obtain access to a selected application instance.

In accordance with some example embodiments, apparatus 300 may include various means, such as memory 301, processor 302, input/output circuitry 303, and/or communications circuitry 304. Apparatus 300, such as a user device 101A-101N or an admin device 103A-103N, may be configured, using one or more of the circuitry 301, 302, 303, and 304, to execute the operations described above with respect to FIG. 1 and below in connection with FIGS. 4-12.

In some embodiments, apparatus 300 communicates with application management system 200 (for example, embodied by the product access configuration server 210 as depicted and described with respect to FIG. 2). It should be appreciated that, in some embodiments, an application management system 200 communicates with any number of apparatus(es) 300. It should be appreciated that the components 301-304 may be embodied similar to that of the similarly named components described with respect to FIG. 2. For purposes of brevity and length of disclosure, duplicate description of such functionality is omitted. Nevertheless, these device elements, operating together, provide the respective apparatuses with the functionality necessary to facilitate the communication of data (e.g., manage access permissions request(s), domain access configuration request(s), instance data, domain data, organization identifier(s), application instance identifier(s), admin user identifier(s), product role selection request(s), domain permissions profile(s), create domain request(s), modify domain request(s), and/or the like) for managing access permissions for a plurality of application instances. That is, the apparatus 300, in some embodiments, is configured, using one or more sets of circuitry 301, 302, 303, and/or 304, to execute the operations described herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of product access configuration server 210, user devices 101A-101N, and admin devices 103A-103N.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a user device (e.g., for purposes of displaying information/data to and receiving user input from a user interacting with a user device or an admin user interacting with an admin device). Information/data generated at the user device (e.g., as a result of the user interaction with an admin device) can be received from the user device (e.g., user device or admin device) at the server.

Example User Interfaces for Centralized Access Permissions Management

In various embodiments of the present disclosure, an apparatus (e.g., product access configuration server 210) is configured to manage access permissions for a plurality of application instances associated with an organization in an application management system 200. FIGS. 4, 5A, 5B, 5C, 5D, 5E, 5F, 6A, 6F, and 12 illustrate example user interfaces and sub-interfaces including various information and enabling various functionality for such centralized access permissions management, in accordance with example embodiments of the present disclosure. It should be appreciated that the information depicted in the various user interfaces is exemplary, and that similar and/or alternative data, parameters, data values, and/or the like may be provided. Additionally or alternatively, in some embodiments, the layout of the various interface elements, and/or sub-interfaces of each depicted user interface may differ without deviating from scope of this disclosure. Further, it should be appreciated that, in some embodiments, data and/or information for centralized access permissions management may be provided without one or more corresponding user interfaces, for example, via one or more APIs made available via an application management system 200 (e.g., product access configuration server 210). As such, the example depicted interfaces, sub-interfaces, elements, and data values depicted therein are provided for descriptive and illustrative purposes and are not to limit the scope or spirit of the disclosure herein.

FIG. 4 illustrates an example centralized access user interface 400 structured in accordance with various embodiments of the present disclosure. In some embodiments, the centralized access user interface is rendered to a client device, for example, an admin device 103A-103N associated with an admin user. In some embodiments, an application management system 200 (e.g., product access configuration server 210) causes rendering of the centralized access user interface 400 in response to receiving a manage access permissions request from the admin device 103A-103N to the application management system 200 (e.g., product access configuration server 210). For example, in response to user interaction with an application management user interface associated with the application management system 200 (e.g., product access configuration server 210), a manage access permissions request is generated at a client device (e.g., an admin device 103A-103N) and transmitted to the application management system 200 (e.g., product access configuration server 210). In a non-limiting example, selection of a settings configuration interface element, such as a "Join settings" or "User access settings" (not depicted), rendered in a sidebar portion of an application management user interface with respect to a "Products" category tab, a manage access permissions request is generated at the client device. In some embodiments, the centralized access user interface 400 is a default interface rendered to the visual display of a client device (e.g., admin user) in response to selection of a "Products" category tab (not depicted) associated with managing applications of the organization.

In certain embodiments, the manage access permissions request comprises one or more data objects (e.g., unique identifier(s)) associated with the requesting user to authenticate or otherwise identify the requesting user as an admin user. For example, in some further embodiments, the manage access permissions request comprises an admin user identifier associated with the requesting admin user. In some embodiments, an admin device 103A-103N receives or accesses the admin user identifier. For example, in some embodiments, the admin user identifier is received remotely, via wireless communication or tethered communication, or directly, via input into one of the admin devices 103A-103N associated with the admin user. In some embodiments, the admin user has a remote device, such as a mobile device or key fob that interacts with the admin device 103A-103N to transmit an admin user identifier and/or other related user data to authenticate the admin user. In another example, an admin user simply provides login credentials through the interface of their admin device 103A-103N. The admin device 103A-103N then transfers the unique admin user identifier to the application management system 200 (e.g., the product access configuration server 210) as part of or in addition to the manage access permissions request.

In some embodiments, the manage access permissions request comprises an organization identifier corresponding to the organization with which the requesting admin user is associated. In some embodiments, the application management system 200 (e.g., the product access configuration server 210) uses the organization identifier (or other unique identifier) to inform the population of data and information to be included or rendered as part of the centralized access user interface 400 and/or a domain access configuration user interface 500. For example, in certain embodiments, the application management system 200 (e.g., the product access configuration server 210) retrieves domain data (e.g., domain name(s), enablement/disablement status for the domain(s), date each domain was added, date each domain was last edited, etc.) associated with one or more domains based on the organization identifier. In some embodiments, the application management system 200 (e.g., the product access configuration server 210) retrieves instance data (e.g., application instance identifier for each application instance associated with domain, an application instance name such as a custom application instance name, an application instance URL, etc.) associated with a plurality of application instances based on the organization identifier. In some embodiments, the application management system 200 (e.g., the product access configuration server 210) retrieves one or more additional data items to be included or rendered as part of the centralized access user interface 400 and/or a domain access configuration user interface 500, including but not limited to, application name for each application instance associated with the domain and application logo for each application instance associated with the domain. Such examples of unique identifier(s), however, are for purposes of illustration and not of limitation and other suitable variations of authenticating and/or associating the manage access permissions request with an organization are also contemplated by this disclosure as will be apparent to one of ordinary skill in the art. For example, in some embodiments, the corresponding organization is determined and/or parsed from an admin user identifier.

As illustrated, the centralized access user interface 400 of FIG. 4 is configured for managing access permissions of one or more domains. Specifically, the centralized access user interface 400 presents domain data associated with one or more domains, for example, a domain access set 416. In some embodiments, the depicted one or more domains have previously been associated with the organization of the admin user. In some embodiments, the application management system 200 (e.g., product access configuration server 210) queries a permissions database based on the organization identifier to retrieve any domains associated with the organization (e.g., domains that have been previously-permissioned with respect to the organization). In other words, in some embodiments, at least one of the domains of the domain access set 416 is a domain that has been previously approved, authenticated, permissioned or otherwise managed with respect to at least one application instance or application associated with the organization. For example, in the example embodiment depicted in FIG. 4, each of acme-.com, acme.com.au, alpha.com, and beta.com domains have previously been permissioned with respect to at least one produce (e.g., application instance) associated with the organization. In some embodiments, a generic or catch-all default domain (e.g., "Any domain" as depicted in the centralized access user interface 400 of FIG. 4), for which access permissions can be centrally managed, is included in the centralized access user interface 400. For example, in an instance in which an organization does not have any specific domain added or previously-permissioned, the domain access set 416 depicted in the centralized access user interface 400 may only identify or list the generic or catch-all default domain (e.g., admin user sees only the "Any domain" item). In this regard, the centralized access user interface 400 presents a domain access set 416, each row or line in the domain access set 416 representing a domain for which access permissions may be managed by the admin user (e.g., management domains).

It should be appreciated that the centralized access user interface 400 may be configured to include various parameters or data associated with a domain, and such parameters or data are not limited to the exemplary parameters and data depicted in FIG. 4. In an example context, as illustrated, a domain name column 402 includes a data value for a parameter representing an identification of each domain in the domain access set 416. For example, "acme.com" is presented in the second row of the domain access set 416 in the exemplary centralized access user interface 400 depicted in FIG. 4. Additionally or alternatively, as illustrated, a product application column 404 includes a data value for a parameter representing the number of products or resources (e.g., application instances) to which the corresponding domain is currently managed. For example, "acme.com" currently is managed with respect to 3 products (e.g., application instances) in the exemplary centralized access user interface 400 depicted in FIG. 4. Additionally or alternatively, as illustrated, a domain enablement column 406 includes a data value for a parameter representing whether or not the access permission(s) associated with the corresponding domain are enabled. For example, the access permissions associated with "acme.com" is currently enabled in the exemplary centralized access user interface 400 depicted in FIG. 4. The domain enablement data value allows an admin user to quickly and easily enable or disable configured access permissions at the domain level. In some instances, when a new domain is created and configured, the default domain enablement data value is disabled such that an admin user must affirmatively enable the configured access permissions. In some embodiments, each domain of the domain access set 416 is depicted with a toggle button in the domain enablement column 406. Such example of a toggle button, however, is for purposes of illustration and not of limitation and other suitable variations of selecting or de-selecting domain enablement are also contemplated by this disclosure as will be apparent to one of ordinary skill in the art. For example, in some embodiments, a checkbox interface element or radio button is associated with each domain.

It should be appreciated that a centralized access user interface 400 may be configured to include any of various types of information. For example, in at least some example embodiments, the centralized access user interface 400 is configured to include one or more of a domain recency indicator indicating if a domain was recently added or created with respect to the organization (e.g., "NEW" as depicted with respect to "acme.com.au" in FIG. 4), a domain information interface element for presenting additional information about the corresponding domain in a sub-interface, and/or the like.

Additionally or alternatively, in some embodiments, user interaction with the centralized access user interface 400 causes rendering of another interface, or sub-interface, for viewing, altering, creating, and/or otherwise managing the access permissions associated with a selected domain. For example, in some embodiments, a domain access configuration user interface 500 as depicted in FIGS. 5A and 5D is generated in response user interaction with the centralized access user interface 400. FIG. 5A illustrates an example domain access configuration user interface 500 associated with creating a new domain that has not been previously permissioned with respect to the organization, the example domain access configuration user interface 500 structured in accordance with various embodiments of the present disclosure. FIG. 5D illustrates an example domain access configuration user interface 500 associated with modifying a domain that has been previously permissioned with respect to the organization, the example domain access configuration user interface 500 structured in accordance with various embodiments of the present disclosure. In some embodiments, the domain access configuration user interface 500 is rendered to a client device, for example, an admin device 103A-103N associated with the admin user, in response to user interaction with the centralized access user interface 400 as described herein. For example, in some embodiments, an application management system 200 (e.g., product access configuration server 210) causes rendering of the domain access configuration user interface 500 in response to receiving a domain access configuration request from the admin device 103A-103N to the application management system 200 (e.g., product access configuration server 210), the domain access configuration request associated with a selected domain. In some embodiments, the domain access configuration request is associated with a domain identifier of the selected domain as described herein.

In some embodiments, the domain access configuration request comprises one or more additional requests. For example, in certain embodiments, user interaction with a domain creation interface element generates a domain access configuration request at the client device (e.g., the admin device 103A-103N associated with the admin user), the domain access configuration request further comprising a create domain request requesting creation of a new domain and configuration of the access permissions for the new domain. In such embodiments, the selected domain is a new domain that has not been previously permissioned with respect to any of the products or resources (e.g., plurality of application instances) associated with the organization. For example, user interaction with the "Add domain" domain creation interface element 410 as depicted in FIG. 4 generates a domain access configuration request, the receipt of which at the application management system 200 (e.g., product access configuration server 210) causes rendering of a domain access configuration user interface 500 or sub-interface, specifically an add new domain access configuration user interface 500 as depicted in FIG. 5A, for managing (e.g., creating) access permissions for a new domain.

Additionally or alternatively, a domain edit interface element 408 is associated with each domain of the displayed domain access set 416 in the centralized access user interface 400 as depicted in FIG. 4. In this regard, in at least some embodiments, user interaction with a domain edit interface element 408 generates a domain access configuration request at the client device (e.g., the admin device 103A-103N associated with the admin user), the domain access configuration request comprising a modify domain request requesting modification of the access permissions previously permissioned for the corresponding domain. For example, "acme.com" is a previously-permissioned domain depicted in the centralized access user interface 400 of FIG. 4 and selection of the "Edit" domain edit interface element associated with "acme.com" generates a domain access configuration request, the receipt of which at the application management system 200 (e.g., product access configuration server 210) causes rendering of a domain access configuration user interface 500 or sub-interface, specifically an edit domain access configuration user interface 500 as depicted in FIG. 5D, based on the selected "acme.com" domain of the domain access set 416.

In certain embodiments, the domain access configuration request comprises one or more data objects, for example, a domain identifier associated with the selected domain to identify the selected domain to the application management system 200 (e.g., product access configuration server 210). For instance, in some embodiments, when the selected domain is a previously-permissioned domain (e.g., the admin user has selected the "Edit" interface element associated with previously-permissioned "acme.com" domain), the domain access configuration request comprises a domain identifier uniquely associated with and identifying the selected domain (e.g., a domain identifier for "acme.com"). In certain embodiments, when the selected domain is a new domain (e.g., the user has selected the "Add domain" interface element), the domain access configuration request comprises a new domain identifier to be associated with the new domain once permissioned.

In some embodiments, the application management system 200 (e.g., product access configuration server 210) retrieves instance data and/or domain data for populating a domain access configuration user interface. For example, in certain embodiments, the application management system 200 (e.g., product access configuration server 210) queries one or more repositories to populate the domain access configuration user interface 500. In this regard, in some embodiments, using the organization identifier associated with the admin user, the application management system 200 (e.g., product access configuration server 210) queries an applications repository for instance data corresponding to the plurality of application instances associated with the organization. For instance, in some embodiments, the instance data associated with an application instance comprises one or more of an application instance identifier, an application instance name, an application instance URL, domain permissions profile(s), a set of available product roles for each application instance, application instance plan identifier, or a combination thereof. In certain embodiments, the application management system 200 (e.g., the product access configuration server 210) retrieves domain data (e.g., domain name(s), enablement/disablement status for the domain(s), date each domain was added, date each domain was last edited, etc.) associated with the selected domain. In some embodiments, the application management system 200 (e.g., the product access configuration server 210) retrieves one or more additional data items to be included or rendered as part of the domain access configuration user interface 500, including but not limited to, application name for each application instance associated with the domain and application logo for each application instance associated with the domain. In still further embodiments, using the organization identifier and/or a domain identifier associated with the selected domain, the application management system 200 (e.g., product access configuration server 210) queries a permissions repository for domain permissions profiles associated with the organization and/or domain identifier. For example, in certain embodiments wherein the selected domain is a domain that has been previously-permissioned with respect to at least one application instance associated with the organization, the application management system 200 (e.g., product access configuration server 210) populates the product role selection interface elements of the corresponding application instances in the domain access configuration user interface based on the product roles previously assigned to or associated with the application instances in accordance with the domain permissions profile(s) returned by the query, as described herein. In still further embodiments, retrieved domain permissions profile(s) are used to populate the corresponding admin approval parameter data values.

As illustrated, the domain access configuration user interfaces 500 of FIGS. 5A and 5D are configured to enable a user (e.g., an admin user) to configure and/or centrally manage domain-based access permissions of a plurality of application instances with respect to a selected domain. Specifically, the domain access configuration user interface 500 presents instance data associated with one or more application instances, for example, an application instance access set 508. In some embodiments, the application instance access set 508 (e.g., the depicted one or more application instances) is associated with the organization of the admin user. In this regard, in some embodiments, the domain access configuration user interface 500 presents a plurality of application instance components (e.g., an application instance access set 508), each application instance component representing a respective application instance of a plurality of application instances associated with the organization.

It should be appreciated that the domain access configuration user interfaces 500 may be configured to include various parameters or data associated with the domain or a particular application instance, and such parameters or data are not limited to the exemplary parameters and data depicted in FIGS. 5A-5F. In some embodiments, a domain access configuration user interface 500 comprises a domain name interface component 510. A domain name interface component 510 is a user interface element that is rendered as a portion of a domain access configuration user interface 500 and is configured to enable a user (e.g., admin user) to create and/or modify a domain name (e.g., text string or data value) for the selected domain. In some embodiments, the domain name interface component 510 includes a data value for a parameter representing an identification of the selected domain. In some embodiments, the domain name interface component 510 of the domain access configuration user interface, for example, an add new domain access configuration user interface 500 as illustrated in FIG. 5A, comprises an example of the text string to be entered to create a domain (e.g., yourcompany.com in a greyed typeset). In some embodiments, the selected domain is the domain of the organization (e.g., associated with the organization identifier). In some embodiments, the selected domain is domain not associated or is external to the organization (e.g., not associated with the organization identifier). In certain embodiments, user entry of a text string identifying the domain to be created is required. In still further embodiments, for example, in association with an add new domain access configuration user interface 500, in response to user entry of a text string in the domain name interface component 510, the product access configuration server 210 determines whether the text string corresponds to a domain that already exists with respect to the organization (e.g., a previously-permissioned domain). In certain embodiments, the product access configuration server 210 queries one or more repositories (e.g., permissions repository 215 and/or applications repository 220) based on the text string. In an instance in which the text string corresponds to a domain that already exists (e.g., a previously-permissioned domain returned by the query(ies), such as acme.com), in some embodiments, the product access configuration server 210 is configured to cause rendering of a notification to the domain access configuration user interface 500 indicating that the domain already exists. In still further embodiments, the product access configuration server 210 is configured to cause rendering of a link, the selection of which by the admin user facilitates access to an edit domain access configuration user interface (e.g., edit domain access configuration user interface 500 in FIG. 5D) associated with the previously-permissioned domain, the edit domain access configuration user interface 500 populated with permissions data associated with identified domain. For example, the product access configuration server 210 populates each product role selection interface element with a product role corresponding to the respective application instance based on the one or more domain permissions profiles stored in association with the identified domain, as described herein.

Additionally or alternatively, in some embodiments, the domain name interface component 510 is associated with a domain name template, the domain name template comprising a nomenclature and/or formatting structure defining the required layout of the domain name text string. For example, in some embodiments, the entry of a comma (",") as part of the text string in the domain name interface component 510 (e.g., "acme.com") is not allowed according to a domain name template associated with interface component 510. In certain embodiments, the product access configuration server 210 is configured to cause rendering of a notification to the domain access configuration user interface 500 indicating that the text string entered is invalid as a domain name.

As illustrated in FIGS. 5A and 5D, in some embodiments, a product name column 502 includes a data value for a parameter representing an identification of each application instance represented in the application instance access set 508. For example, "Confluence HR" and "Confluence External" are presented in the first and second row, respectively, of the application instance access set 508 in the exemplary domain access configuration user interfaces 500 depicted in FIGS. 5A and 5D. In some further embodiments, additional identifying information is displayed in the product name column 502 to uniquely identify the corresponding application instance. For example, as illustrated in FIGS. 5A and 5D, the "Confluence HR" application instance component presented in the first row of the application instance access set 508 also includes a data value for a parameter representing a URL or site with which the application instance is associated (e.g., "acme-hr.atlassian.net"). For example, a user may attempt to access such application instance of Confluence® at acme-hr.atlassian.net/confluence. The exemplary "Confluence External" application instance component presented in the second row of the application instance access set 508 also includes a data value for a parameter representing a URL or site with which the application instance is associated (e.g., "acme-CS.atlassian.net"). For example, a user may attempt to access such application instance of Confluence® at acme-CS.atlassian.net/confluence. Accordingly, at least two separate application instances of Confluence® are associated with Acme Corporation at different URLs or sites. It should be appreciated that the product name column 502 may be configured to include any of various types of information to more particularly identify or distinguish the corresponding application instance from the other application instances. For example, in at least some example embodiments, the product name column 502 is configured to include one or more additional application instance identifier(s).

Additionally or alternatively, as illustrated, a product role column 504 includes a data value for a parameter representing the product role to be associated with users of the selected domain in association with the corresponding application instance. For example, in some embodiments, a domain access configuration user interface 500 comprises a product role selection interface element 520 rendered in association with each application instance component, each product role selection interface element 520 configured to receive a product role selection, thereby enabling a user (e.g., admin user) to define (e.g., select) a product role to be assigned to the selected domain with respect to accessing the corresponding application instance. In some embodiments, each product role selection interface element 520 is populated with one or more available product role(s) associated with the selected application instance. For example, in some embodiments, instance data stored in a permissions repository and/or an applications repository comprises a plurality of available product role(s) for each application instance. A product role is associated with (e.g., defines) a level or type of access to a product or resource (e.g., application instance). For example, in the example embodiment illustrated in FIG. 5A, product roles have not yet been associated or assigned to any of the corresponding application instances depicted in the domain access configuration user interface 500 (e.g., add new domain access configuration user interface). In certain such embodiments, the product role selection interface is defaulted to "None", indicating that users associated with the selected domain currently do not have access to the corresponding application instance (e.g., without additional admin approval).

Turning to the example embodiment illustrated in FIG. 5D, product roles have been previously assigned or associated with each of the depicted application instances. For example, in the non-limiting example illustrated in FIG. 5D, when attempting to access the Confluence® application instance at acme-hr.atlassian.net, users associated with or credentialed with the "acme.com" domain (e.g., users attempting to access an application instance having an email domain of @acme.com in their email address) are permissioned to access such application instance in accordance with a "User" role. In a further non-limiting example, when attempting to access the Confluence® External application instance at acme-CS.atlassian.net, users associated with or credentialed with the "acme.com" domain are permissioned to access such application instance in accordance with a "Helpseeker" product role. In some embodiments, the level or type of access associated with a selected product role is a default associated with the application management system 200 or the particular application instance. In some further embodiments, the level or type of access associated with a selected product role, and even the existence or creation of a product role, is separately configurable by the organization (e.g., via an admin user). For example, in some embodiments, a plurality of product roles can be associated with an organization, the level or type of access associated with each product role being separately definable and made available to any one or more a plurality of application instances associated with the organization. In certain embodiments, revisions and changes made to the level or type of access associated with a product role applies to all application instances in which the product role is an available product role, allowing quick and efficient changes to access permissions.

Additionally or alternatively, in some embodiments, user interaction with a product role selection interface element 520 generates a product role selection request associated with the corresponding application instance with respect to the selected domain. For example, in the non-limiting example illustrated in FIG. 5B, an admin user has selected the drop-down menu associated with the product role selection interface element 520, revealing available product roles associated with the corresponding application instance of Confluence® HR at acme-hr.atlassian.net (e.g., an available product roles set including None, Guest, User, and Auditor roles). In some embodiments, as illustrated in FIG. 5B, each available product role is rendered with a brief summary or description of the type of access associated with product role. The admin user interacts or engages with the depicted available product roles set to select a product role to be associated with the corresponding application instance for the selected domain of "xyz.com", thereby generating a product role selection request. For example, in response to user interaction with the product role selection interface element 520 to select the "Auditor" product role, a product role selection request is generated at a client device (e.g., an admin device 103A-103N) and transmitted to the application management system 200 (e.g., product access configuration server 210). In some embodiments, the product role selection request comprises a product role identifier associated with the selected product role. In the embodiments depicted in FIGS. 5A-5C, the product role selection interface element 520 is depicted as a drop-down menu. Such example of a product role selection interface element 520, however, is for purposes of illustration and not of limitation and other suitable variations of depicting a product role selection interface element are also contemplated by this disclosure as will be apparent to one of ordinary skill in the art. For example, in some embodiments, a checkbox interface element or radio button is associated with each available product role.

In the non-limiting example illustrated in FIG. 5E, although a "User" product role was previously populated in the product role selection interface element 520, an admin user has now selected the drop-down menu associated with the product role selection interface element 520, revealing available product roles associated with the corresponding application instance of Confluence® HR at acme-hr.atlassian.net (e.g., an available product roles set including "None", "Guest", "User", and "Auditor" product roles) for the acme-.com domain. In some embodiments, as illustrated in FIG. 5E, each available product role is rendered with a brief summary or description of the type of access associated with product role. The admin user interacts or engages with the depicted available product roles set to select a new, updated product role to be associated with the corresponding application instance for the selected domain of "acme.com", thereby generating a product role selection request. For example, in response to user interaction with the product role selection interface element 520 to select the "Guest" product role, a product role selection request is generated at a client device (e.g., an admin device 103A-103N) and transmitted to the application management system 200 (e.g., product access configuration server 210). In some embodiments, the product role selection request comprises a product role identifier associated with the selected product role. In the embodiments depicted in FIGS. 5D-5F, the product role selection interface element 520 is depicted as a drop-down menu. Such example of a product role selection interface element 520, however, is for purposes of illustration and not of limitation and other suitable variations of depicting a product role selection interface element are also contemplated by this disclosure as will be apparent to one of ordinary skill in the art. For example, in some embodiments, a checkbox interface element or radio button is associated with each available product role.

In some embodiments, an application management system 200 (e.g., product access configuration server 210) causes rendering of an updated domain access configuration user interface 500. In some embodiments, such rendering of an updated domain access configuration user interface 500 is performed in response to receiving the product role selection request from the admin device 103A-103N. In the non-limiting example of the embodiments illustrated in FIGS. 5B and 5C, the admin user has selected the "Auditor" product role for the "xyz.com" domain with respect to the Confluence® HR application instance at acme-hr.atlassian.net, and the application management system 200 (e.g., product access configuration server 210) causes rendering of the updated domain access configuration user interface 500 as depicted in FIG. 5C. Similarly, in the non-limiting example of the embodiments illustrated in FIGS. 5E and 5F, the admin user has selected the "Guest" product role for the "acme.com" domain with respect to the Confluence® HR application instance at acme-hr.atlassian.net, and the application management system 200 (e.g., product access configuration server 210) causes rendering of the updated domain access configuration user interface 500 as depicted in FIG. 5F.

Returning to the data value(s) depicted in a domain access configuration user interface 500, additionally or alternatively, in some embodiments, an admin approval column 506 includes a data value for a parameter representing whether or not admin approval is to be required for users associated with the selected domain to access the corresponding application instance. For example, in some embodiments, as illustrated in FIG. 5D, a domain access configuration user interface 500 comprises an admin approval user interface element 530 rendered in association with each application instance component, each admin approval user interface element 530 configured to receive an indication of an admin approval parameter request, thereby enabling a user (e.g., admin user) to define an admin approval access parameter associated with the corresponding application instance. As depicted in the example illustrated in FIG. 5D, in some embodiments, the admin approval user interface element 530 is a checkbox interface element, the selection of which indicates that admin approval is to be required for users associated with the selected domain to access the corresponding application instance. In such embodiments, when such admin approval is enabled with respect to a particular application instance, even a user from an approved (e.g., managed) domain associated with an assigned product role defining at least some level of access (e.g., "User", "Helpseeker", or the like, as opposed to "None") still requires approval from an admin user before being granted access to the particular application instance. For example, in the non-limiting example illustrated in FIG. 5D, further admin approval is still required for a user associated with the acme.com domain when accessing the Confluence® Internal application instance to be granted access according to the "User" product role. In a further non-limiting example illustrated in FIG. 5D, further admin approval is not required for a user associated with the acme.com domain when accessing the Confluence® External application instance at acme-CS.atlassian.net. In such example, an acme.com user would be granted access in accordance with the "Helpseeker" role to such application instance without requirement of further admin approval.

In some embodiments, admin approval required is a default data value or setting for the admin approval column 506. In some other embodiments, no admin approval required is a default data value or setting for the admin approval column 506. The admin user interacts or engages with the depicted admin approval user interface element 530 (e.g., checking the checkbox interface element or unchecking the checkbox interface element), thereby generating an admin approval parameter request in accordance with the admin approval parameter. In some embodiments, the admin approval parameter request is generated at a client device (e.g., an admin device 103A-103N) and transmitted to the application management system 200 (e.g., product access configuration server 210). In some embodiments, the admin approval parameter request comprises an admin approval identifier and/or admin approval access parameter associated with the selection. The admin approval user interface element 530 allows an admin user to quickly and easily enable or disable the requirement for admin approval at the domain level for each application instance.

In some embodiments, the application management system 200 (e.g., product access configuration server 210) receives a product role selection request in response to user interaction with a product role selection interface element 520. Similarly, in some embodiments, the application management system 200 (e.g., product access configuration server 210) receives an approval admin parameter request in response to user interaction with an admin approval user interface element 530. For example, in some embodiments, product role selection request(s) and/or approval admin parameter request(s) are generated by the admin device 103A-103N and transmitted to the product access configuration server 210 each time the admin user adds, removes, selects, and/or otherwise interacts with the respective product role selection interface 520 or admin approval user interface element 530 to permission a selected domain with respect to a plurality of application instances, such that the admin user experiences passively saved changes or modifications.

Additionally or alternatively, in some embodiments, product role selection request(s) and/or approval admin parameter request(s) generated by the admin device 103A-103N each time the user adds, removes, selects, and/or otherwise interacts with the respective product role selection interface 520 or approval user interface element 530, however, the product role selection request(s) and/or approval admin parameter request(s) are only transmitted to the product access configuration server 210 upon a further affirmative selection by the admin user. For example, in some embodiments, a client session is initiated by or on the admin device 103A-103N in association with the domain access configuration request in order to capture any modifications or changes (e.g., additions, deletions, selections, etc.) detected in association with a domain access configuration user interface 500 and causes an "Add" (e.g., in association with an add new domain access configuration user interface) or "Save" (e.g., in association with an edit domain access configuration user interface) icon, actuator button, or other executable interface element 512 to be rendered to the domain access configuration user interface 500 in response to such detections. In association with detecting an interaction with the "Add" or "Save" icon, actuator button, or other executable interface element 512 associated with authorizing additions, changes, or modifications, the admin device 103A-103N transmits all captured product role selection request(s) and/or approval admin parameter request(s) associated with the detected additions, changes, or modifications. In still further embodiments, if no interaction with the "Add" or "Save" icon, actuator button, or other executable interface element 512 is detected, or interaction with a "Cancel" icon, actuator button, or other executable interface element 514 is detected, the admin device does not transmit such captured product role selection request(s) and/or approval admin parameter request(s) to the apparatus (e.g., product access configuration server 210).

Additionally or alternatively, in some embodiments, as illustrated in FIG. 5D, a domain access configuration user interface comprises a "Remove" or "Delete" icon, button, or interface element 540. In some embodiments, user interaction with a "Remove" or "Delete" icon, button, or interface element 540 generates a remove domain request at the admin device 103A-103N and transmits such request to the product access configuration server 210. The product access configuration server 210 is configured to generate and cause a confirmation interface (not depicted) comprising a remove domain confirmation component (e.g., "Confirm" actuator button) to be rendered to or in association with the domain access configuration user interface 500. In some embodiments, the confirmation interface comprises a notification regarding users associated with selected domain no longer being able to access the organization's products or resources (e.g., without an individual invitation). In response to confirmation of such removal request, the product access configuration server 210 causes deletion of the permissioned domain from corresponding repository.

Additionally or alternatively, in some embodiments, as illustrated in FIGS. 5A-5F, the domain access configuration user interface 500 comprises an admin notification configuration interface element 550. In some embodiments, user interaction with an admin notification configuration interface element 550 generates an admin notification request at the admin device 103A-103N and transmits such request to the product access configuration server 210. The admin notification request is received by the product access configuration server 210. The admin notification request comprises an admin notification parameter, the admin notification parameter defining if and when admin users associated with the organization are to receive notification of users of the selected domain obtain access to a resource. For example, in some embodiments, user interaction with a radio button of the admin notification configuration interface element 550 indicates admin users are to be sent a notification upon each instance a user gains access to a resource. In some embodiments, user interaction with a radio button of the admin notification configuration interface element 550 indicates admin users are to be sent a notification when a user requires admin approval to gain access to a resource. In further embodiments, user interaction with a radio button of the admin notification configuration interface element 550 indicates no notifications relative to users of the selected domain gaining access are to be sent to admin users. In other embodiments, no such notifications sent if none of the radio buttons are selected by the user. In still further embodiments, user interaction with a radio button of the admin notification configuration interface element 550 indicates selection of one or more admin users to receive notifications. As depicted in FIG. 5A, in some embodiments, user interaction with a search field, dropdown menu, and/or picker field defines the admin notification parameters.

In some embodiments, user interaction with the domain access configuration user interface 500 enables variable domain provisioning in the application management system 200 (e.g., product access configuration server 210). For example, in some embodiments, in response to receiving a product role selection request, the application management system 200 (e.g., product access configuration server 210) generates a domain permissions profile associated with the selected domain, the domain permissions profile being a data structure comprising a plurality of application instances, each application instance associated with a corresponding product role (e.g., based on the product role selection request). The product role defines the role-based domain access permission of the selected domain (e.g., users associated with the selected domain) for accessing the selected application instance associated with the product role selection request. With respect to generating a domain permissions profile, the term "generates" refers to both creating a domain permissions profile in a first instance (e.g., in association with an add domain access configuration user interface) and also to updating a domain permissions profile in a subsequent instance (e.g., in association with an edit domain access configuration user interface).

Additionally or alternatively, in certain embodiments, in response to receiving a product role selection request, the application management system 200 (e.g., product access configuration server 210) generates an application instance permissions profile associated with the corresponding application instance, the application instance permissions profile being a data structure comprising one or more permissioned domains, each domain associated with a corresponding product role (e.g., based on the product role selection request). The product role defines the role-based domain access permission of the corresponding domain (e.g., users associated with the domain) for accessing the selected application instance. With respect to generating an application instance permissions profile, the term "generates" refers to both creating an application instance permissions profile in a first instance (e.g., in association with permissioning a domain with respect to the application instance for the first time) and also to updating an existing application instance permissions profile in a subsequent instance (e.g., in association with revising and/or editing a product role associated with a domain that has previously been permissioned, permissioning a second domain after a first domain has previously been permissioned with respect to the application instance, etc.). In some embodiments, such an application instance permissions profile can be subsequently queried by the application management system 200 (e.g., product access configuration server 210) to determine if a user's email domain is identified as an approved (e.g., permissioned) domain associated with a requested application instance based on an application instance identifier associated with the requested application instance.

FIG. 6A illustrates an example product access user interface 600 structured in accordance with various embodiments of the present disclosure. In some embodiments, the product access user interface 600 is rendered to a client device, for example, a user device 101A-101N associated with a user. For instance, in some embodiments, utilizing an application instance URL for access to a desired application instance, a user is redirected to and presented with the product access user interface 600 depicted in FIG. 6A. For example, in some embodiments, a user associated with xyz.com who attempts to access the application instance of Confluence® HR at acme-hr.atlassian.net/confluence is redirected to and presented with the product access user interface 600 depicted in FIG. 6A. In such an instance wherein the parsed email domain matches a previously-permissioned (e.g., approved) domain of xyz.com, as discussed with respect to FIGS. 5A-5C, the user has access to the application instance in accordance with the "Auditor" role-based domain access permission, and in some embodiments, simply selects the "Join on {orgName}" interface element to obtain access to the requested application instance.

FIG. 6B illustrates an example request product access user interface 650. When the domain associated with a user is approved/permissioned to access the requested application instance, however, an admin approval access parameter associated with the selected resource of that domain indicates approval by an admin user is required before a user is granted access to the selected resource (e.g., an application instance), in some embodiments, the product access configuration server 210 causes rendering of a request product access user interface, such as depicted by request product access user interface 650 in FIG. 6B, to a visual display of the user device 101A associated with the access application instance request.

Although not depicted, in an example instance wherein the domain associated with a user requesting access to a selected application instance is either not permissioned to access the requested application instance (e.g., domain is not recognized with respect to the corresponding application instance), the domain enablement data value has been disabled, or the product role associated with the domain for the requested application instance is determined to be, for example, "None" or "No product access", the product access configuration server 210 directs the user to, and causes rendering of, an error user interface (e.g., "You do not have access to this product. If this is incorrect, please contact your Atlassian admin.") to a visual display of the user device 101A associated with the access application instance request.

Example Operations for Managing Access Permissions for a Plurality of Application Instances Turning now to FIG. 7A, a flowchart broadly illustrates a series of operations or process blocks for managing access permissions for a plurality of application instances, in accordance with some example embodiments of the present disclosure. The example operations of FIG. 7A are illustrated from the perspective of an application management system 200. The operations illustrated in FIG. 7A may, for example, be performed by, with the assistance of, and/or under the control of one or more apparatuses, such as product access configuration server 210, as described above. In this regard, performance of the operations may invoke one or more of memory 201, processor 202, input/output circuitry 203, communications circuitry 204, and/or permissions circuitry 205.

In the embodiment illustrated in FIG. 7A, as shown in operation 705, the apparatus (e.g., product access configuration server 210) includes means, such as input/output circuitry 203, communications circuitry 204, and/or the like, for receiving a manage access permissions request. In some embodiments, this request is received from a computing device associated with an admin user, such as admin device 103A-103N. In some further embodiments, this request is received via a network 102, as illustrated in FIG. 1. However, in some embodiments, this information is received by direct user input using input/output circuitry 203. In still further embodiments, the manage access permissions request comprises a unique identifier, such as an organization identifier associated with the admin user and/or an admin user identifier from which the organization identifier can be determined and/or extracted. By way of a non-limiting exemplary illustration, Jennifer is an admin user for Acme Corporation and in response to Jennifer selecting the "User Access Settings" interface element associated with an administration user interface for Acme Corporation in the application management system 200, a manage access permissions request, comprising an organization identifier associated with Acme Corporation, is generated at Jennifer's admin device and transmitted via a network to the apparatus (e.g., product access configuration server 210).

In operation 710, the apparatus (e.g., product access configuration server 210) includes means, such as processor 202, input/output circuitry 203, communications circuitry 204, permissions circuitry 205 and/or the like, for causing rendering of a centralized access user interface to a visual display of the computing device associated with the admin user (e.g., an admin device 103A-103N) in response to receiving the manage access permissions request. As described herein, the centralized access user interface is configured for managing access permissions of one or more domains. For example, in a non-limiting exemplary illustration, in response to receiving the manage access permissions request from the admin device associated with Jennifer, the apparatus (e.g., product access configuration server 210) causes rendering of a centralized access user interface to the visual display of Jennifer's admin device. In one embodiment, the centralized access user interface comprises a listing of one or more manageable domains as described above with respect to FIG. 4.

In operation 715, the apparatus (e.g., product access configuration server 210) includes means, such as processor 202, input/output circuitry 203, communications circuitry 204, permissions circuitry 205 and/or the like, for receiving a domain access configuration request associated with a first domain in response to user interaction with the centralized access user interface. For example, in a non-limiting exemplary illustration, in response to Jennifer's selection of the "Add domain" interface element in the exemplary centralized access user interface depicted in FIG. 4, a domain access configuration request associated with a new domain to be permissioned is generated by Jennifer's admin device and transmitted to and received by the product access configuration server 210. In certain embodiments, the domain access configuration request optionally further comprises a create domain request requesting creation of the new domain for configuration of the access permissions of the new domain. In a similar non-limiting exemplary illustration, in response to Jennifer's selection of the "Edit" interface element associated with the "acme.com" domain listed in the exemplary centralized access user interface depicted in FIG. 4, a domain access configuration request associated with the previously-permissioned "acme.com" domain is generated by Jennifer's admin device and transmitted to and received by the product access configuration server 210. In certain embodiments, the domain access configuration request optionally further comprises a modify domain request requesting modification of the access permissions of the previously-permissioned domain (e.g., "acme.com" domain).

In operation 720, the apparatus (e.g., product access configuration server 210) includes means, such as processor 202, input/output circuitry 203, communications circuitry 204, permissions circuitry 205 and/or the like, for retrieving instance data associated with a plurality of application instances, each application instance associated with the organization identifier. In some embodiments, the apparatus (e.g., product access configuration server 210) retrieves such instance data from one or more repositories, such as a permissions repository and/or an applications repository. In some embodiments, instance data associated with an application instance comprises one or more of an application instance identifier, an application instance name, an application instance URL, a domain permissions profile, a set of available product roles. By way of a non-limiting exemplary illustration, the product access configuration server 210 retrieves instance data for a plurality of application instances based on Acme Corporation's organization identifier. In some embodiments, such as in the context of the non-limiting example of Jennifer editing the access permissions for "acme.com", retrieving instance data by the product access configuration server 210 optionally comprises querying a permissions repository for domain permissions profiles associated with the previously-permissioned domain (e.g., acme.com).

In operation 725, the apparatus (e.g., product access configuration server 210) includes means, such as processor 202, input/output circuitry 203, communications circuitry 204, permissions circuitry 205 and/or the like, for causing rendering of a domain access configuration user interface associated with the first domain. In some embodiments, the retrieved instance data is used to populate the domain access configuration user interface such that the domain access configuration user interface is based on at least the instance data. The domain access configuration user interface comprises a plurality of application instance components, wherein each application instance component represents a respective application instance of the plurality of application instances. In some embodiments, the domain access configuration user interface further comprises a product role selection interface element in association with each application instance component. By way of a non-limiting exemplary illustration, the product access configuration server 210 causes rendering of an add new domain access configuration user interface (e.g., domain access configuration user interface 500 depicted in FIG. 5A) in response to receiving the domain access configuration request associated with a new domain in operation 715. In another non-limiting exemplary illustration, the product access configuration server 210 causes rendering of an edit domain access configuration user interface (e.g., domain access configuration user interface 500 depicted in FIG. 5D) in response to receiving the domain access configuration request associated with the previously-permissioned "acme.com" domain in operation 715.

Thereafter, in operation 730, the apparatus (e.g., product access configuration server 210) includes means, such as processor 202, input/output circuitry 203, communications circuitry 204, permissions circuitry 205 and/or the like, for receiving a first product role selection request in response to user interaction with a product role selection interface element corresponding to a first application instance. By way of a non-limiting exemplary illustration, Jennifer interacts with the product role selection interface element corresponding to "Confluence HR" application instance at "acme-HR.atlassian.net" to select the "Auditor" product role (e.g., domain access configuration user interface 500 depicted in FIGS. 5B and 5C) for the new "xyz.com" domain, thereby generating a product role selection request at Jennifer's admin device and transmitting the product role selection request to be received by the product access configuration server 210. In another non-limiting exemplary illustration, Jennifer interacts with the product role selection interface element corresponding to "Confluence HR" application instance at "acme-hr.atlassian.net" to select the "Guest" product role (e.g., domain access configuration user interface 500 depicted in FIGS. 5E and 5F) for the "acme.com" domain, thereby generating a product role selection request at Jennifer's admin device and transmitting the product role selection request to be received by the product access configuration server 210.

Subsequently, in operation 735, the apparatus (e.g., product access configuration server 210) includes means, such as processor 202, permissions circuitry 205 and/or the like, for generating a first domain permissions profile. In some embodiments, the first domain permissions profile comprises at least a first product role associated with the first application instance, the first product role defining the role-based domain access permission of the first domain for accessing the first application instance.

By way of a non-limiting exemplary illustration, in response to Jennifer's selection of the "Auditor" product role with respect to the "Confluence HR" application instance at "acme-hr.atlassian.net" in the add new domain access configuration user interface associated with "xyz.com" as described above with respect to operation 730 (e.g., receipt by the product access configuration server 210 of the product role selection request from Jennifer's admin device), the product access configuration server 210 generates a domain permissions profile with respect to "xyz.com". In such non-limiting example, the xyz.com domain permissions profile comprises at least the "Auditor" product role is association with the "Confluence HR" application instance at "acme-hr.atlassian.net" (e.g., in association with an application instance identifier for such application instance). For context, the "Auditor" product role defines the role-based domain access permission of "xyz.com" for accessing the "Confluence HR" application instance at "acme-hr.atlassian.net".

By way of another non-limiting exemplary illustration, in response to Jennifer's selection of the "Guest" product role with respect to the "Confluence HR" application instance at "acme-hr.atlassian.net" in the edit domain access configuration user interface associated with "acme.com" as described above with respect to operation 730 (e.g., receipt by the product access configuration server 210 of the product role selection request from Jennifer's admin device), the product access configuration server 210 generates (e.g., updates) the domain permissions profile associated with acme.com. In this example, the term "generates" refers to updating the domain permissions profile, as the acme.com domain permissions profile already exists. In such non-limiting example, the acme.com domain permissions profile comprises at least the "Guest" product role (instead of the "User" product role) in association with the "Confluence HR" application instance at "acme-hr.atlassian.net" (e.g., in association with an application instance identifier for such application instance). For context, the "Guest" product role defines the role-based domain access permission of "acme.com" for accessing the "Confluence HR" application instance at "acme-hr.atlassian.net".

Additionally or alternatively, in certain embodiments, the apparatus (e.g., product access configuration server 210) includes means, such as processor 202, permissions circuitry 205 and/or the like, for generating a first application instance permissions profile associated with the first application instance, wherein the first application instance permissions profile comprises at least the first domain, the first domain associated with a corresponding product role defining the role-based domain access permission of the first domain for accessing the first application instance.

Subsequently, in operation 740, the apparatus (e.g., product access configuration server 210) includes means, such as processor 202, permissions circuitry 205 and/or the like, for storing the first domain permissions profile in a permissions repository in association with the first domain and the first application instance. Additionally or alternatively, in certain embodiments, the apparatus (e.g., product access configuration server 210) includes means, such as processor 202, permissions circuitry 205 and/or the like, for storing the first application instance permissions profile in a permissions repository in association with the first application instance and the first domain. In some embodiments, such an application instance permissions profile can be subsequently queried by the application management system 200 (e.g., product access configuration server 210) to determine if a user's email domain is identified as an approved (e.g., permissioned) domain associated with a requested application instance based on an application instance identifier associated with the requested application instance.

FIG. 7B is a signal diagram of an example data flow represented by the operations depicted in FIG. 7A. That is, FIG. 7B illustrates an example signal diagram illustrating data flow interactions between a product access configuration server, a repository, and an admin device when managing access permissions for a plurality of application instances in accordance with one embodiment. FIG. 7B is described as being performed by a product access configuration server 210, an permissions repository 215, and an admin device 103A. These may be similar to those previously discussed with regards to FIG. 1.

Turning now to FIG. 8, a flowchart broadly illustrates another series of operations or process blocks for managing access permissions for a plurality of application instances such that a single domain can be associated with variable product roles in relation to multiple application instances, in accordance with some example embodiments of the present disclosure. The example operations of FIG. 8 are illustrated from the perspective of an application management system. The operations illustrated in FIG. 8 may, for example, be performed by, with the assistance of, and/or under the control of one or more apparatuses, such as product access configuration server 210, as described above. In this regard, performance of the operations may invoke one or more of memory 201, processor 202, input/output circuitry 203, communications circuitry 204, and/or permissions circuitry 205.

In the embodiment illustrated in FIG. 8, as shown in operation 805, the apparatus (e.g., product access configuration server 210) includes means, such as input/output circuitry 203, communications circuitry 204, and/or the like, for receiving a second product role selection request in response to user interaction with a product role selection interface element associated with a second application instance. Continuing the non-limiting exemplary illustration of admin user Jennifer permissioning "xyz.com" to have an "Auditor" product role with respect to a first instance of Confluence® (e.g., the Confluence HR application instance at acme-hr.atlassian.net), Jennifer further interacts with the product role selection interface element corresponding to a second application instance of Confluence® (e.g., "Confluence External" application instance at "acme.atlassian.net" as illustrated in the domain access configuration user interface 500 depicted in FIGS. 5B and 5C) to select a "Customer" product role for the "xyz.com" domain, thereby generating a product role selection request at Jennifer's admin device and transmitting the product role selection request to be received by the product access configuration server 210.

Subsequently, in operation 810, the apparatus (e.g., product access configuration server 210) includes means, such as processor 202, permissions circuitry 205 and/or the like, for updating the first domain permissions profile. In some embodiments, the updated first domain permissions profile comprises at least the first product role associated with the first application instance and a second product role associated with the second application instance, the first product role and second product role defining the role-based domain access permissions of the first domain for accessing the first application instance and second application instance, respectively. For example, the xyz.com domain permissions profile comprises the "Auditor" product role in association with the first application instance (e.g., the Confluence HR application instance at acme-hr.atlassian.net) and the "Customer" product role in association with the second application instance (e.g., the "Confluence External" application instance at "acme.atlassian.net").

Subsequently, in operation 815, the apparatus (e.g., product access configuration server 210) includes means, such as processor 202, permissions circuitry 205 and/or the like, for storing the updated first domain permissions profile in a permissions repository in association with the first domain, the first application instance, and the second application instance. For instance, continuing with the non-limiting xyz.com domain example, the xyz.com domain permissions profile is stored in association with xyz.com, the Confluence® HR application instance, and the Confluence® External application instance for Acme Corporation, thereby allowing Jennifer to centrally manage access permissions of a plurality of application instances while enabling variable domain permissioning across such plurality of application instances based on role-based domain access permissions.

Turning now to FIG. 9, a flowchart broadly illustrates another series of operations or process blocks for managing access permissions for a plurality of application instances such that variable domains can be associated with different product roles in relation to a single application instance, in accordance with some example embodiments of the present disclosure. The example operations of FIG. 9 are illustrated from the perspective of an application management system 200. The operations illustrated in FIG. 9 may, for example, be performed by, with the assistance of, and/or under the control of one or more apparatuses, such as product access configuration server 210, as described above. In this regard, performance of the operations may invoke one or more of memory 201, processor 202, input/output circuitry 203, communications circuitry 204, and/or permissions circuitry 205.

In the embodiment illustrated in FIG. 9 as shown in operation 905, the apparatus (e.g., product access configuration server 210) includes means, such as input/output circuitry 203, communications circuitry 204, and/or the like, for receiving a domain access configuration request associated with a second domain in response to user interaction with the centralized access user interface. Continuing the non-limiting exemplary illustration of admin user Jennifer permissioning "xyz.com" to have an "Auditor" product role with respect to a first instance of Confluence® (e.g., the Confluence HR application instance at acme-hr.atlassian.net), Jennifer further interacts with the "Edit" interface element associated with a second domain "acme.com" in the centralized access user interface, thereby generating a domain access configuration request associated with "acme.com" at Jennifer's admin device and transmitting the domain access configuration request to be received by the product access configuration server 210.

Subsequently, in operation 910, the apparatus (e.g., product access configuration server 210) includes means, such as processor 202, input/output circuitry 203, communications circuitry 204, permissions circuitry 205 and/or the like, for causing rendering, based on the previously-retrieved instance data, of a domain access configuration user interface associated with the second domain (e.g., acme.com as illustrated in FIG. 5D).

Thereafter, in operation 915, the apparatus (e.g., product access configuration server 210) includes means, such as input/output circuitry 203, communications circuitry 204, and/or the like, for receiving a second product role selection request in response to user interaction with a product role selection interface element associated with the first application instance. Continuing the non-limiting exemplary illustration, admin user Jennifer further interacts with the product role selection interface element corresponding to the first application instance of Confluence® (e.g., "Confluence HR" application instance at "acme-hr.atlassian.net" as illustrated in the domain access configuration user interface 500 depicted in FIGS. 5E and 5F) to select an "Guest" product role for the "acme.com" domain, thereby generating a product role selection request at Jennifer's admin device and transmitting the product role selection request to be received by the product access configuration server 210.

Subsequently, in operation 920, the apparatus (e.g., product access configuration server 210) includes means, such as processor 202, permissions circuitry 205 and/or the like, for generating a second domain permissions profile, wherein the second domain permissions profile comprises a second product role associated with the first application instance, the second product role defining the role-based domain access permission of the second domain for accessing the first application instance. In a non-limiting example, the product access configuration server 210 generates (e.g., updates) an acme.com domain permissions profile to reflect the "Guest" product role for acme.com with respect to the first application instance (e.g., "Confluence HR" application instance at "acme-hr.atlassian.net") such that the acme.com domain permissions profile comprises the "Guest" product role associated with the Confluence® HR application instance, the "Guest" product role defining the role-based domain access permission of acme.com users for accessing the first application instance (e.g., "Confluence HR" application instance at "acme-hr.atlassian.net").

In operation 925, the apparatus (e.g., product access configuration server 210) includes means, such as processor 202, permissions circuitry 205 and/or the like, for storing the second domain permissions profile in the permissions repository in association with the second domain and the first application instance. Continuing the non-limiting exemplary illustration, the product access configuration server 210 stores the acme.com domain permissions profile in association with the acme.com domain and the Confluence® HR application instance (e.g., at acme-hr.atlassian.net). In some embodiments, unique identifiers associated with each object (e.g., application instance identifier, domain identifier(s), etc.) are stored in association. Accordingly, in some embodiments, the permissions repository comprises a plurality of domain permissions profiles. By way of non-limiting example, the permissions repository comprises a xyz.com domain permissions profile, wherein the xyz.com domain is associated with an "Auditor" product role with respect to the Confluence® HR application instance and further comprises an acme.com domain permissions profile, wherein the acme.com domain is associated with an "Guest" product role with respect to the Confluence® HR application instance, thereby allowing Jennifer to centrally manage access permissions of a plurality of application instances while enabling variable permissioning across at least one application instance based on role-based domain access permissions.

Turning now to FIG. 10A, a flowchart broadly illustrates another series of operations or process blocks for programmatically managing access permissions for a plurality of application instances to provide a user with access to an application instance in accordance with a role-based domain access permission, in accordance with some example embodiments of the present disclosure. The example operations of FIG. 10A are illustrated from the perspective of an application management system. The operations illustrated in FIG. 10A may, for example, be performed by, with the assistance of, and/or under the control of one or more apparatuses, such as product access configuration server 210, as described above. In this regard, performance of the operations may invoke one or more of memory 201, processor 202, input/output circuitry 203, communications circuitry 204, and/or permissions circuitry 205.

In the embodiment illustrated in FIG. 10A, as shown in operation 1005, the apparatus (e.g., product access configuration server 210) includes means, such as input/output circuitry 203, communications circuitry 204, and/or the like, for receiving an access application instance request associated with an application instance. In some embodiments, the requested application instance is associated with an organization and the access application instance request comprises a user email address identifier associated with a user. In some embodiments, this request is received from a computing device associated with the user, such as user device 101A-101N. In some further embodiments, this request is received via a network 102, as illustrated in FIG. 1. In still further embodiments, the access application instance request comprises one or more unique identifiers, such as an organization identifier with which the requested application instance is associated, an application instance identifier associated with the requested application instance, a user email address identifier associated with the user, and/or a combination thereof. For example, in some embodiments, a user simply provides login credentials, including an email address, through the interface of their user device 101A-101N. For example, if the user is not logged into their Atlassian account and the user attempts to access the application instance URL for a selected instance of Confluence®, the application management system (e.g., product access configuration server 210) detects and/or determines that the user has not logged in based on the user's session/cookie history. In some such embodiments, the product access configuration server 210 causes redirection of the user to a URL to provide the user's login credentials (e.g., login.atlassian.com). In certain embodiments, after receiving and authenticating the user's login credentials, the product access configuration server 210 redirects the authenticated user back to the selected application instance URL. The user device 101A-101N then transfers the unique user email address identifier to the application management system 200 (e.g., the product access configuration server 210) as part of or in addition to the access application instance request. In some embodiments, the user attempts to access the requested application instance via the URL associated with the application instance (e.g., acme.atlassian.net/Confluence), the attempt thereby generating the access application instance request at the user device 101A-101N to be transmitted to the product access configuration server 210. By way of a non-limiting exemplary illustration, Bob is a user employed by XYZ Corporation with an email address of bob@xyz.com. In such example, Bob attempts to access the Confluence® HR application instance at acme.atlassian.net. Bob is re-directed to a landing page wherein he provides his user email address. In some embodiments, the provided user email address identifier and an identifier associated with the requested application instance are transmitted with the access application instance request.

Subsequently, in operation 1010, the apparatus (e.g., product access configuration server 210) includes means, such as processor 202, input/output circuitry 203, permissions circuitry 205 and/or the like, for parsing the user email address identifier for an email domain. For example, Bob's email address of bob@xyz.com is parsed to identify the xyz.com domain.

Thereafter, in operation 1015, the apparatus (e.g., product access configuration server 210) includes means, such as processor 202, input/output circuitry 203, permissions circuitry 205 and/or the like, for querying a permissions repository (e.g., permissions repository 215) for a domain permissions profile based on the parsed email domain. In the non-limiting exemplary example, the product access configuration server 210 queries the permissions repository 215 based on the parsed xyz.com email domain. Additionally or alternatively, in certain embodiments, the apparatus (e.g., product access configuration server 210) includes means, such as processor 202, input/output circuitry 203, permissions circuitry 205 and/or the like, for querying a permissions repository (e.g., permissions repository 215) for an application instance permissions profile based on the application instance identifier associated with the requested application instance.

Subsequently, in operation 1020, in an instance wherein a domain permissions profile is returned based on the query, the apparatus (e.g., product access configuration server 210) includes means, such as processor 202, input/output circuitry 203, permissions circuitry 205 and/or the like, for determining whether the returned domain permissions profile comprises a product role associated with the requested application instance. With respect to the above-described non-limiting example, the product access configuration server 210 determines whether the returned xyz.com domain permissions profile comprises a product role associated with the requested Confluence® HR application instance. Additionally or alternatively, in certain embodiments, the apparatus (e.g., product access configuration server 210) includes means, such as processor 202, input/output circuitry 203, permissions circuitry 205 and/or the like, for determining whether the returned application instance permissions profile comprises the parsed email domain. In such instance wherein the parsed email domain is included in the application instance permissions profile, the apparatus (e.g., product access configuration server 210) includes means, such as processor 202, input/output circuitry 203, permissions circuitry 205 and/or the like, for further determining whether a product role is associated with the parsed email domain in the application instance permissions profile. With respect to the above-described non-limiting example, the product access configuration server 210 determines whether a returned Confluence® HR application instance permissions profile comprises xyz.com domain, and if so, whether a product role is associated with the xyz.com domain.

In operation 1025, in an instance wherein the domain permissions profile comprises a product role associated with the requested application instance, the apparatus (e.g., product access configuration server 210) includes means, such as processor 202, input/output circuitry 203, permissions circuitry 205 and/or the like, for providing the user with access to the requested application instance based on a role-based domain access permission corresponding to the identified product role. For example, the product access configuration server 210 provides Bob with access to the Confluence® HR application instance (e.g., directs Bob's web browser to the URL of the application instance) with "Auditor" role-based domain access permission. In the event that the identified product role defines no product access (e.g., product role is identified as "None"), the user is required to request access from the organization. The request product access process is described in greater detail below with respect to FIG. 11.

FIG. 10B is a signal diagram of an example data flow represented by the operations depicted in FIG. 10A. That is, FIG. 10B illustrates an example signal diagram illustrating data flow interactions between a product access configuration server, a repository, and a user device when programmatically managing access permissions for a plurality of application instances in accordance with one embodiment. FIG. 10B is described as being performed by a product access configuration server 210, a permissions repository 215, and a user device 101A. These may be similar to those previously discussed with regards to FIG. 1.

Turning now to FIG. 11, a flowchart broadly illustrates another series of operations or process blocks for programmatically managing access permissions for a plurality of application instances in response to an access application instance request associated with an unauthorized domain, in accordance with some example embodiments of the present disclosure. The example operations of FIG. 11 are illustrated from the perspective of an application management system. The operations illustrated in FIG. 11 may, for example, be performed by, with the assistance of, and/or under the control of one or more apparatuses, such as product access configuration server 210, as described above. In this regard, performance of the operations may invoke one or more of memory 201, processor 202, input/output circuitry 203, communications circuitry 204, and/or permissions circuitry 205.

In the embodiment illustrated in FIG. 11, as shown in operation 1105, the apparatus (e.g., product access configuration server 210) includes means, such as processor 202, input/output circuitry 203, communications circuitry 204, permissions circuitry 205 and/or the like, for causing rendering of a request product access user interface to a visual display of a computing device associated with the access application instance request. For example, in some embodiments, the product access configuration server 210 causes rendering of a request product access user interface, such as the request product access user interface 650 as depicted in FIG. 6B to a visual display of the user device 101A associated with the access application instance request.

Thereafter, as shown in operation 1110, the apparatus (e.g., product access configuration server 210) includes means, such as processor 202, input/output circuitry 203, communications circuitry 204, permissions circuitry 205 and/or the like, for receiving a request product access request associated with the requested application instance in response to user interaction with the request product access user interface.

Subsequently, in operation 1115, the apparatus (e.g., product access configuration server 210) includes means, such as processor 202, input/output circuitry 203, communications circuitry 204, permissions circuitry 205 and/or the like, for generating a request product access notification associated with the requested application instance, the request product access notification comprising the user email address identifier.

Thereafter, in operation 1120, the apparatus (e.g., product access configuration server 210) includes means, such as processor 202, input/output circuitry 203, communications circuitry 204, permissions circuitry 205 and/or the like, for transmitting the request product access notification to at least one admin user associated with the organization. For example, in some embodiments, the request product access notification is an email or is associated with an email sent to one or more admin users associated with the organization. In still further embodiments, the request product access notification is associated with an access requests user interface 1200 as depicted in FIG. 12, wherein an admin user can review a plurality of request product access requests and associated data. In some embodiments, the access requests user interface 1200 comprises an access user column 1202, which includes a data value for a parameter representing a user for whom access is being requested (e.g., user identifier, user email address identifier, etc.). In some embodiments, the access requests user interface 1200 comprises an access requestor column 1204, which includes a data value for a parameter representing the requesting user and in further embodiments, a data value representing lapse of time since request was made. In still further embodiments, the access requests user interface 1200 comprises an associated product(s) column 1206, which includes a data value for a parameter representing one or more products (e.g., applications, application instances, references) associated with the request product access notification. In further embodiments, the access requests user interface 1200 comprises an available action(s) column 1208, which includes a data value for a parameter representing one or more potentially available further action(s) for handling the request product access notification (e.g., approve now, deny, request more information concerning the request, etc.).

FIGS. 7A, 7B, 8, 9, 10A, 10B, and 11 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the product access configuration server 210 and executed by a processor 202 of the product access configuration server 210. As will be appreciated, any such computer program instructions may be loaded onto a computer or other programmable apparatus (e.g., hardware) to produce a machine, such that the resulting computer or other programmable apparatus implements various functions, including those functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for managing access permissions for a plurality of application instances associated with an organization, the apparatus comprising at least one processor and at least one non-transitory memory including program code, the at least one non-transitory memory and the program code configured to, with the at least one processor, cause the apparatus to:
receive a manage access permissions request from a computing device associated with an admin user, the manage access permissions request comprising an organization identifier;
cause rendering of a centralized access user interface to a visual display of the computing device associated with the admin user in response to receiving the manage access permissions request, the centralized access user interface configured for managing access permissions of one or more domains, wherein each of the one or more domains is a previously-permissioned domain associated with the organization identifier, a default domain, or a new domain that has not been previously permissioned with respect to the organization identifier;
receive a domain access configuration request associated with a first domain of the one or more domains in response to user interaction with the centralized access user interface;
retrieve instance data associated with a plurality of application instances, each application instance associated with the organization identifier;
cause rendering, based on at least the instance data, of a domain access configuration user interface associated with the first domain, the domain access configuration user interface comprising a plurality of application instance components, wherein each application instance component represents a respective application instance of the plurality of application instances and comprises a product role selection interface element;
receive a first product role selection request in response to user interaction with a product role selection interface element corresponding to a first application instance;
generate a first domain permissions profile, wherein the first domain permissions profile comprises at least a first product role associated with the first application instance, the first product role defining a role-based domain access permission of the first domain for accessing the first application instance; and
store the first domain permissions profile in a permissions repository in association with the first domain and the first application instance.

2. The apparatus of claim 1, wherein the first domain is a domain that has not been previously permissioned such that the domain access configuration request comprises a create domain request requesting creation of the first domain and configuration of the access permissions of the first domain.

3. The apparatus of claim 1, wherein the first domain is a previously-permissioned domain such that domain access configuration request comprises a modify domain request requesting modification of the access permissions of the first domain.

4. The apparatus of claim 3, wherein retrieving instance data associated with the plurality of application instances comprises:
querying the permissions repository for domain permissions profiles associated with the first domain.

5. The apparatus of claim 4, wherein causing rendering of the domain access configuration user interface associated with the first domain comprises:
populating each product role selection interface element with a product role corresponding to the respective application instance based on the domain permissions profiles returned by the query.

6. The apparatus of claim 1, wherein the at least one non-transitory memory and the program code further are configured to, with the at least one processor, cause the apparatus to:
receive a second product role selection request in response to user interaction with a product role selection interface element associated with a second application instance;
update the first domain permissions profile such that the first domain permissions profile comprises at least the first product role associated with the first application instance and a second product role associated with the second application instance, the first product role and the second product role defining the role-based domain access permissions of the first domain for accessing the first application instance and the second application instance, respectively; and
store the updated first domain permissions profile in the permissions repository in association with the first domain, the first application instance, and the second application instance.

7. The apparatus of claim 1, wherein the at least one non-transitory memory and the program code further are configured to, with the at least one processor, cause the apparatus to:
receive a domain access configuration request associated with a second domain of the one or more domains in response to user interaction with the centralized access user interface;
cause rendering, based on the instance data, of a domain access configuration user interface associated with the second domain;
receive a second product role selection request in response to user interaction with a product role selection interface element associated with the first application instance;
generate a second domain permissions profile, wherein the second domain permissions profile comprises a second product role associated with the first application instance, the second product role defining the role-based domain access permission of the second domain for accessing the first application instance; and
store the second domain permissions profile in the permissions repository in association with the second domain and the first application instance.

8. The apparatus of claim 1, wherein the domain access configuration user interface further comprises an admin approval user interface element associated with each application instance component of the plurality of application instance components, the admin approval user interface element configured for receiving an admin approval parameter request.

9. The apparatus of claim 1, wherein the instance data associated with an application instance comprises one or more of an application instance identifier, an application instance name, an application instance URL, an application instance permissions profile, a set of available product roles.

10. The apparatus of claim 1, wherein the product role selection interface element for the first application instance is associated with a plurality of available product roles.

11. The apparatus of claim 10, wherein the product role selection interface element for the first application instance comprises a drop down menu, the drop down menu listing the plurality of available product roles associated with the first application instance, the product role selection interface element configured to receive a product role selection.

12. A method for managing access permissions for a plurality of application instances associated with an organization, the method comprising:
receiving a manage access permissions request from a computing device associated with an admin user, the manage access permissions request comprising an organization identifier;
causing rendering of a centralized access user interface to a visual display of the computing device associated with the admin user in response to receiving the manage access permissions request, the centralized access user interface configured for managing access permissions of one or more domains, wherein each of the one or more domains is a previously-permissioned domain associated with the organization identifier, a default domain, or a new domain that has not been previously permissioned with respect to the organization identifier;
receiving a domain access configuration request associated with a first domain of the one or more domains in response to user interaction with the centralized access user interface;
retrieving instance data associated with a plurality of application instances, each application instance associated with the organization identifier;
causing rendering, based on at least the instance data, of a domain access configuration user interface associated with the first domain, the domain access configuration user interface comprising a plurality of application instance components, wherein each application instance component represents a respective application instance of the plurality of application instances and comprises a product role selection interface element;
receiving a first product role selection request in response to user interaction with a product role selection interface element corresponding to a first application instance;
generating a first domain permissions profile, wherein the first domain permissions profile comprises at least a first product role associated with the first application instance, the first product role defining a role-based domain access permission of the first domain for accessing the first application instance; and
storing the first domain permissions profile in a permissions repository in association with the first domain and the first application instance.

13. The method of claim 12, wherein the first domain is a domain that has not been previously permissioned such that the domain access configuration request comprises a create domain request requesting creation of the first domain and configuration of the access permissions of the first domain.

14. The method of claim 12, wherein the first domain is a previously-permissioned domain such that domain access configuration request comprises a modify domain request requesting modification of the access permissions of the first domain.

15. The method of claim 14, wherein retrieving instance data associated with the plurality of application instances comprises:
querying the permissions repository for domain permissions profiles associated with the first domain.

16. The method of claim 15, wherein causing rendering of the domain access configuration user interface associated with the first domain comprises:
populating each product role selection interface element with a product role corresponding to the respective application instance based on the domain permissions profiles returned by the query.

17. The method of claim 12, the method further comprising:
receiving a second product role selection request in response to user interaction with a product role selection interface element associated with a second application instance;
updating the first domain permissions profile such that the first domain permissions profile comprises at least the first product role associated with the first application instance and a second product role associated with the second application instance, the first product role and the second product role defining the role-based domain access permissions of the first domain for accessing the first application instance and the second application instance, respectively; and
storing the updated first domain permissions profile in the permissions repository in association with the first domain, the first application instance, and the second application instance.

18. The method of claim 12, the method further comprising:
receiving a domain access configuration request associated with a second domain of the one or more domains in response to user interaction with the centralized access user interface;
causing rendering, based on the instance data, of a domain access configuration user interface associated with the second domain;
receiving a second product role selection request in response to user interaction with a product role selection interface element associated with the first application instance;
generating a second domain permissions profile, wherein the second domain permissions profile comprises a second product role associated with the first application instance, the second product role defining the role-based domain access permission of the second domain for accessing the first application instance; and
storing the second domain permissions profile in the permissions repository in association with the second domain and the first application instance.

19. The method of claim 12, wherein the domain access configuration user interface further comprises an admin approval user interface element associated with each application instance component of the plurality of application instance components, the admin approval user interface element configured for receiving an admin approval parameter request.

20. The method of claim 12, wherein the instance data associated with an application instance comprises one or more of an application instance identifier, an application instance name, an application instance URL, a domain permissions profile, and a set of available product roles.

21. The method of claim 12, wherein the product role selection interface element for the first application instance is associated with a plurality of available product roles.

22. The method of claim 21, wherein the product role selection interface element for the first application instance comprises a drop down menu, the drop down menu listing the plurality of available product roles associated with the first application instance, the product role selection interface element configured to receive a product role selection.

* * * * *